US011641232B2

(12) United States Patent
Kang et al.

(10) Patent No.: US 11,641,232 B2

(45) Date of Patent: May 2, 2023

(54) METHOD FOR CARRYING OUT BEAM FAILURE RECOVERY IN WIRELESS COMMUNICATION SYSTEM AND DEVICE THEREFOR

(71) Applicant: LG Electronics Inc., Seoul (KR)

(72) Inventors: Jiwon Kang, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/756,677

(22) PCT Filed: Nov. 19, 2018

(86) PCT No.: PCT/KR2018/014231

§ 371 (c)(1),
(2) Date: Apr. 16, 2020

(87) PCT Pub. No.: WO2019/098798

PCT Pub. Date: May 23, 2019

(65) Prior Publication Data

US 2020/0274606 A1 Aug. 27, 2020

Related U.S. Application Data

(60) Provisional application No. 62/587,547, filed on Nov. 17, 2017.

(51) Int. Cl.

*H04B 7/06* (2006.01)
*H04L 5/00* (2006.01)

(Continued)

(52) U.S. Cl.

CPC ......... *H04B 7/0695* (2013.01); *H04B 7/0626* (2013.01); *H04L 5/0051* (2013.01); *H04W 56/001* (2013.01); *H04W 74/0833* (2013.01)

(58) Field of Classification Search

CPC ................ H04B 7/0695; H04B 7/0626; H04L 5/0051; H04L 5/00; H04W 56/001;

(Continued)

(56) References Cited

U.S. PATENT DOCUMENTS

2013/0065622 A1 3/2013 Hwang
2018/0110066 A1* 4/2018 Luo .................. H04W 72/1236
2018/0227899 A1* 8/2018 Yu ............................ H04B 7/02
2018/0302889 A1* 10/2018 Guo ..................... H04B 7/0617
2018/0367374 A1* 12/2018 Liu ....................... H04L 5/0023

(Continued)

FOREIGN PATENT DOCUMENTS

CN 1017793 87 7/2010
CN 107079459 8/2017
WO WO2017024516 2/2017

OTHER PUBLICATIONS

Intel Corporation, "Remaining Issues on Beam Failure Recovery," R1-1717369, 3GPP TSG-RAN WG1 Meeting #90bis, dated Oct. 9-13, 2017, 4 pages.

(Continued)

*Primary Examiner* — Ajit Patel
*Assistant Examiner* — Wilfred Thomas
(74) *Attorney, Agent, or Firm* — Fish & Richardson P.C.

(57) ABSTRACT

Disclosed is a method of performing a beam failure recovery in a wireless communication system. The beam failure recovery method performed by a user equipment includes detecting a beam failure, identifying a new beam for the beam failure recovery, and transmitting a beam failure recovery request to a base station using a PRACH resource. The PRACH resource includes a first PRACH resource and a second PRACH resource. The first PRACH resource and the second PRACH resource are associated with a SS block (SSB). If the SSB is identified as the new beam, the beam failure recovery request is transmitted using the first (Continued)

PRACH resource. If a channel state information (CSI)-reference signal (RS) resource is identified as the new beam, the beam failure recovery request is transmitted using the second PRACH resource.

6 Claims, 18 Drawing Sheets

(51) Int. Cl.
*H04W 56/00* (2009.01)
*H04W 74/08* (2009.01)

(58) Field of Classification Search
CPC ............. H04W 74/0833; H04W 16/28; H04W 24/02; H04W 24/10; H04W 72/04
See application file for complete search history.

(56) References Cited

U.S. PATENT DOCUMENTS

| | | | | |
|---|---|---|---|---|
| 2019/0052337 | A1* | 2/2019 | Kwon | H04W 72/085 |
| 2019/0058629 | A1* | 2/2019 | Akoum | H04W 56/001 |
| 2019/0074891 | A1* | 3/2019 | Kwon | H04W 74/0833 |
| 2019/0141696 | A1* | 5/2019 | Kim | H04W 72/0413 |
| 2020/0059967 | A1* | 2/2020 | Kim | H04W 74/0833 |
| 2020/0099437 | A1* | 3/2020 | Harada | H04L 5/0053 |
| 2020/0120704 | A1* | 4/2020 | Wang | H04B 7/0695 |
| 2020/0120714 | A1* | 4/2020 | Wang | H04W 74/0833 |
| 2020/0186218 | A1* | 6/2020 | Wu | H04B 7/0632 |
| 2020/0281039 | A1* | 9/2020 | Yang | H04W 16/28 |
| 2020/0288334 | A1* | 9/2020 | Takeda | H04W 24/04 |
| 2020/0305146 | A1* | 9/2020 | Matsumura | H04L 5/0012 |
| 2020/0389220 | A1* | 12/2020 | Kang | H04W 74/0833 |
| 2020/0389282 | A1* | 12/2020 | Turtinen | H04W 74/0833 |

OTHER PUBLICATIONS

Huawei, HiSilicon, "Beam failure recovery design details," R1-1717302, 3GPP TSG RAN WG1 Meeting #90bis, Prague, Czech Republic, dated Oct. 9-13, 2017, 7 pages.
LG Electronics, "Discussion on beam failure recovery," R1-1717942, 3GPP TSG RAN WG1 Meeting 90bis, Prague, CZ, dated Oct. 9-13, 2017, 5 pages.
EP Extended European Search Report in European Appln. No. 18877879.9, dated Jul. 16, 2021, 11 pages.
Huawei & HiSilicon, "Procedure Details for Beam Failure Recovery," R1-1712224, Presented at 3GPP TSG RAN WG1 Meeting #90, Prague, Czech Republic, Aug. 21-25, 2017, 12 pages.
MediaTek, "Summary on Beam Recovery Mechanism," R1-1716767, Presented at 3GPP TSG RAN WG1 Meeting NR AH#3 R1-1716767, Nagoya, Japan, Sep. 18-21, 2017, Agenda item: 6.2.2.4, 23 pages.
SG Search Report in Singapore Appln. No. 11202003186P, dated May 14, 2021, 11 pages.
ZTE, "Offline summary for A1 7.6 NR UL power control," R1-1719132, Presented at 3GPP TSG RAN WG1 Meeting #90bis, Prague, Czechia, Oct. 9-13, 2017, 2 pages.
MediaTek Inc., "On 4-step RACH procedure," R1-1710824, Presented at 3GPP TSG RAN WG1 NR Ad-Hoc#2, Qingdao, P.R. China Jun. 27-30, 2017, 6 pages.
NTT Docomo, Inc., "Resource allocation for PUCCH," R1-1718214, Presented at 3GPP TSG RAN WG1 Meeting 90bis, Prague, CZ, Oct. 9-13, 2017, 11 pages.
Office Action in Japanese Appln. No. 2020-527117, dated Aug. 17, 2021, 7 pages (with English translation).
Samsung, "Beam failure recovery," R1-1715941, Presented at 3GPP TSG RAN WG1 Meeting NR#3, Nagoya, Japan Sep. 18-21, 2017, 6 pages.
Vivo, "Group the different RACH events," R2-1710961, Presented at 3GPP TSG-RAN WG2 Meeting #99bis, Prague, Czech Republic, Oct. 9-13, 2017, 2 pages.
Office Action in Chinese Appln. No. 201880073113.0, dated Jan. 11, 2023, 7 pages.

* cited by examiner

FIG. 8

| | | PMI Feedback Type | |
|---|---|---|---|
| | | No PMI (OL, TD, single-antenna) | With PMI (CL) |
| PUSCH CQI feedback type | Wideband (Wideband CQI) | | Mode 1-2: Multiple PMI<br>RI<br>1st wideband CQI (4bit)<br>2nd wideband CQI (4bit) if RI>1<br>Subband PMIs on each subband |
| | UE Selected (subband CQI) | Mode 2-0<br>RI (only for Open-loop SM)<br>Wideband CQI (4bit)+Best-M CQI (2bit)<br>Best-M index<br>when RI>1, CQI of first codeword | Mode 2-2: Multiple PMI<br>RI<br>1st wideband CQI (4bit)+Best-M CQI (2bit)<br>2nd wideband CQI (4bit)+Best-M CQI (2bit) if RI>1<br>Wideband PMI Best-M PMI<br>Best-M index |
| | Higher layer-configured (subband CQI) | Mode 2-0<br>RI (only for Open-loop SM)<br>Wideband CQI (4bit)+subband CQI (2bit)<br>when RI>1, CQI of first codeword | Mode 3-1: Single PMI<br>RI<br>1st wideband CQI (4bit)+subband CQI (2bit)<br>2nd wideband CQI (4bit)+subband CQI (2bit) if RI>1<br>Wideband PMI |

FIG. 9

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-loop SM) ]<br>One wideband CQI (4bit) ]<br>when RI>1, CQI of first codeword | Mode 1-1<br>RI ]<br>Wideband CQI (4bit)<br>Wideband spatial CQI (3bit) for RI>1<br>Wideband PMI (4bit) ] |
| | UE Selected | Mode 2-0<br>RI (only for Open-loop SM) ]<br>Wideband CQI (4bit) ]<br>Best-1 CQI (4bit) in each BP<br>Best-1 indicator (L-bit label) ]<br>when RI>1, CQI of first codeword | Mode 2-1<br>RI ]<br>Wideband CQI (4bit)<br>Wideband spatial CQI (3bit) for RI>1<br>Wideband PMI (4bit) ]<br>Best-1 CQI (4bit) 1 in each BP<br>Best-1 spatial CQI (3bit) for RI>1<br>Best-1 indicator (L-bit label) ] |

FIG. 10
(a)
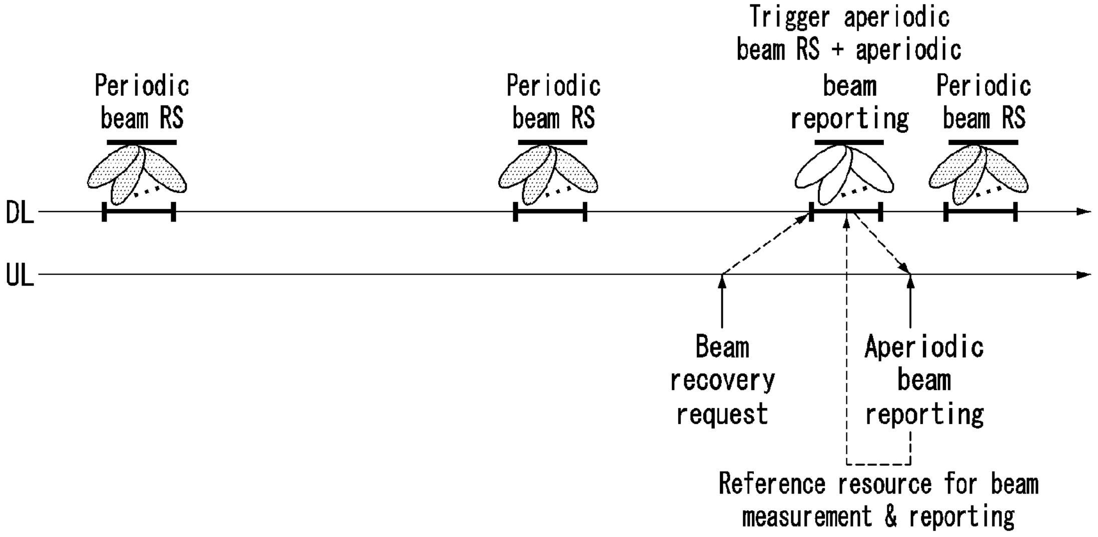
(b)
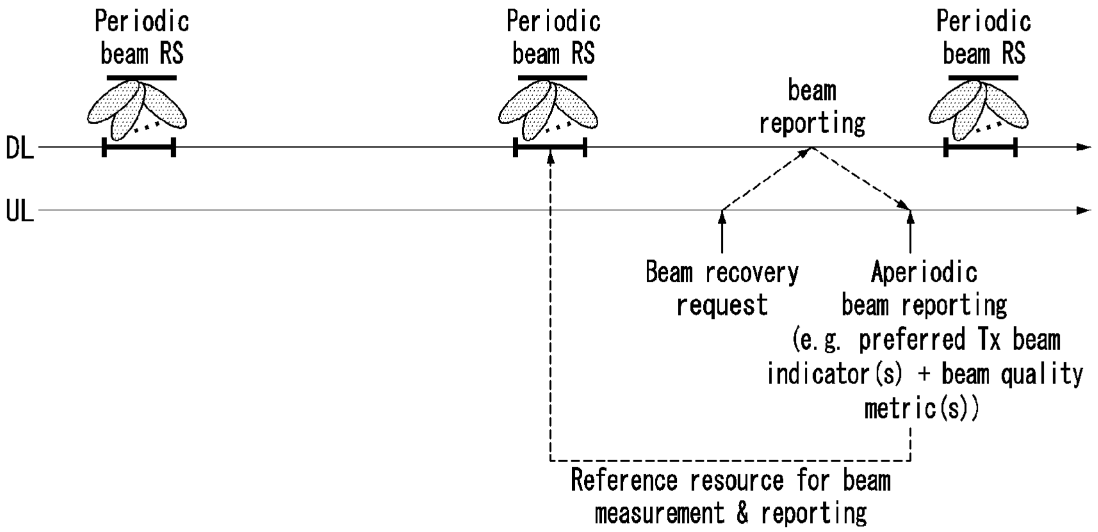

FIG. 11
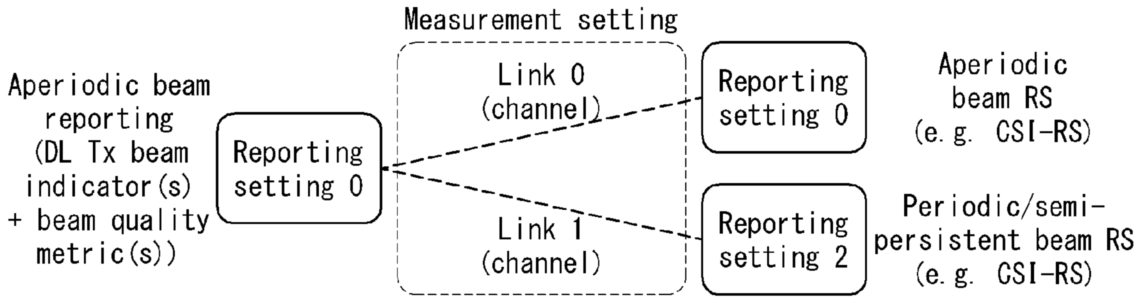
(a)
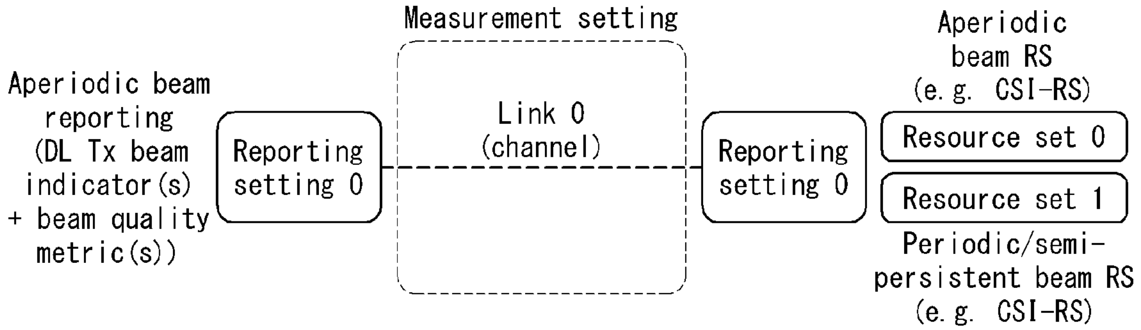
(b)

METHOD FOR CARRYING OUT BEAM FAILURE RECOVERY IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/014231, filed on Nov. 19, 2018, which claims the benefit of U.S. Provisional Application No. 62/587,547, filed on Nov. 17, 2017, the contents of which are all hereby incorporated by reference herein in their entirety.

TECHNICAL FIELD

The present disclosure relates to a wireless communication system, and more particularly to a method of performing a beam failure recovery and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure provides a method capable of solving ambiguity for a new beam by associating two PRACH resources with an SS block (SSB).

The present disclosure also provides a method capable of increasing the efficiency of beam use by configuring a priority when both an SSB and channel state information (CSI)-reference signal (RS) have quality equal to or greater than a threshold.

The technical objects of the present disclosure are not limited to the aforementioned technical objects, and other technical objects, which are not mentioned above, will be apparently appreciated by a person having ordinary skill in the art from the following description.

Technical Solution

In one aspect, there is provided a method of performing, by a user equipment, a beam failure recovery in a wireless communication system. The method comprises detecting a beam failure, identifying a new beam for the beam failure recovery, and transmitting a beam failure recovery request to a base station using a PRACH resource, wherein the PRACH resource includes a first PRACH resource and a second PRACH resource, wherein the first PRACH resource and the second PRACH resource are associated with a SS block (SSB), wherein when the SSB is identified as the new beam, the beam failure recovery request is transmitted using the first PRACH resource, wherein when a channel state information (CSI)-reference signal (RS) resource is identified as the new beam, the beam failure recovery request is transmitted using the second PRACH resource.

The CSI-RS resource is spatially quasi-co located (QCL) with the SSB.

The new beam is at least one RS satisfying a predefined condition.

When both the SSB and the CSI-RS resource satisfy the predefined condition, the CSI-RS resource is identified as the new beam.

In another aspect, there is provided a method of performing, by a base station, a beam failure recovery in a wireless communication system, the method comprising transmitting, to a user equipment (UE), information related to a new beam identification for the beam failure recovery, and receiving a beam failure recovery request from the UE using a PRACH resource, wherein the PRACH resource includes a first PRACH resource and a second PRACH resource, wherein the first PRACH resource and the second PRACH resource are associated with a SS block (SSB), wherein when the new beam is the SSB, the beam failure recovery request uses the first PRACH resource, wherein when the new beam is a channel state information (CSI)-reference signal (RS) resource, the beam failure recovery request uses the second PRACH resource.

The CSI-RS resource is spatially quasi-co located (QCL) with the SSB.

The new beam is at least one RS satisfying a predefined condition.

When both the SSB and the CSI-RS resource satisfy the predefined condition, the CSI-RS resource is identified by the UE as the new beam.

In another aspect, there is provided a user equipment (UE) performing a beam failure recovery in a wireless communication system, the UE comprising a radio frequency (RF) module configured to transmit and receive a radio signal, and a processor functionally connected to the RF module, wherein the processor is configured to detect a beam failure, identify a new beam for the beam failure recovery, and transmit a beam failure recovery request to a base station using a PRACH resource, wherein the PRACH resource includes a first PRACH resource and a second PRACH resource, wherein the first PRACH resource and the second PRACH resource are associated with a SS block (SSB), wherein when the SSB is identified as the new beam, the beam failure recovery request is transmitted, wherein when a reference signal (RS) resource is identified as the new beam, the beam failure recovery request is transmitted using the second PRACH resource.

The CSI-RS resource is spatially quasi-co located (QCL) with the SSB.

The new beam is at least one RS satisfying a predefined condition.

When both the SSB and the CSI-RS resource satisfy the predefined condition, the CSI-RS resource is identified as the new beam.

Advantageous Effects

The present disclosure can solve ambiguity for a new beam by associating two PRACH resources with an SS block (SSB).

The present disclosure can also increase the efficiency of beam use by configuring a priority when both an SSB and channel state information (CSI)-reference signal (RS) have quality equal to or greater than a threshold.

Advantages which can be obtained in the present disclosure are not limited to the aforementioned effects and other unmentioned advantages will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

FIG. 8 illustrates an example of a PUSCH CSI reporting mode.

FIG. 9 illustrates an example of a PUCCH CSI reporting mode.

FIG. 10 illustrates an example of a network operation depending on whether there is an alternative beam.

FIG. 11 illustrates an example of a beam related configuration method.

MODE FOR INVENTION

Figure 1:
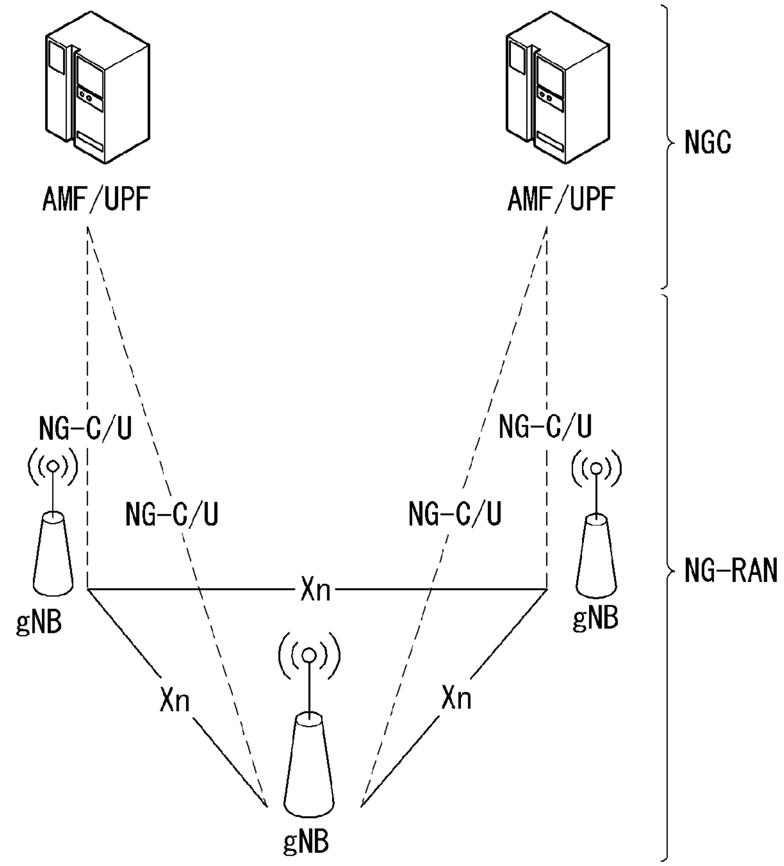
FIG. 1 illustrates an example of an overall system structure of NR to which a method described in the present disclosure is applicable.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

The 5G new radio (NR) system defines enhanced mobile broadband (eMBB), massive machine type communications (mMTC), ultra-reliable and low latency communications (URLLC), and vehicle-to-everything (V2X) based on usage scenario.

The 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Embodiments of the disclosure can be supported by the standard documents disclosed in at least one of IEEE 802, 3GPP, and 3GPP2 which are radio access systems. That is, steps or parts in embodiments of the disclosure which are not described to clearly show the technical spirit of the present disclosure can be supported by the standard documents. Further, all terms disclosed in the present disclosure can be described by the standard documents.

In order to more clarify a description, 3GPP LTE/LTE-A/NR (New Radio) is chiefly described, but the technical features of the present disclosure are not limited thereto.

DEFINITION OF TERMS eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 illustrates an example of an overall structure of a new radio (NR) system to which a method described in the present disclosure is applicable.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^{\mu} \cdot 15\ \lfloor kHz \rfloor$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max}\cdot N_f)$. In this case, $\Delta f_{max}=480\cdot 10^3$, and $N_f=4096$. DL and UL transmission is configured as a radio frame having a section of $T_f=(\Delta f_{max}N_f/100)\cdot T_s=10$ ms. The radio frame is composed of ten subframes each having a section of $T_{sf}=(\Delta f_{max}N_f/1000)\cdot T_s=1$ ms. In this case, there may be a set of UL frames and a set of DL frames.

Figure 2:
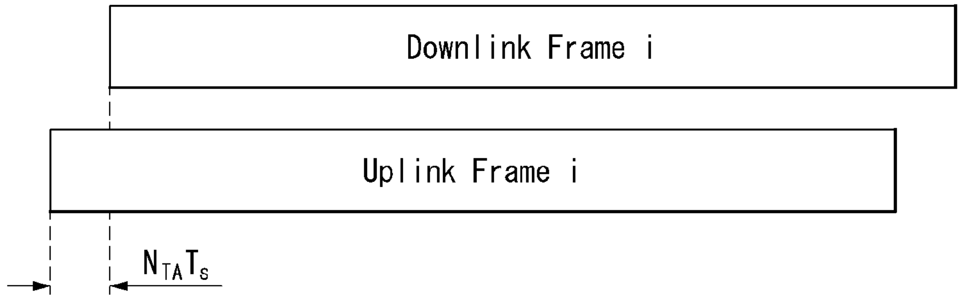
FIG. 2 illustrates a relationship between an uplink frame and a downlink frame in a wireless communication system to which a method described in the present disclosure is applicable.

FIG. 2 illustrates a relationship between a UL frame and a DL frame in a wireless communication system to which a method described in the present disclosure is applicable.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^{\mu}\in\{0, \ldots, N_{subframe}^{slots,\mu}-1\}$ in a subframe, and in ascending order of $n_{s,f}^{\mu}\in\{0, \ldots, N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
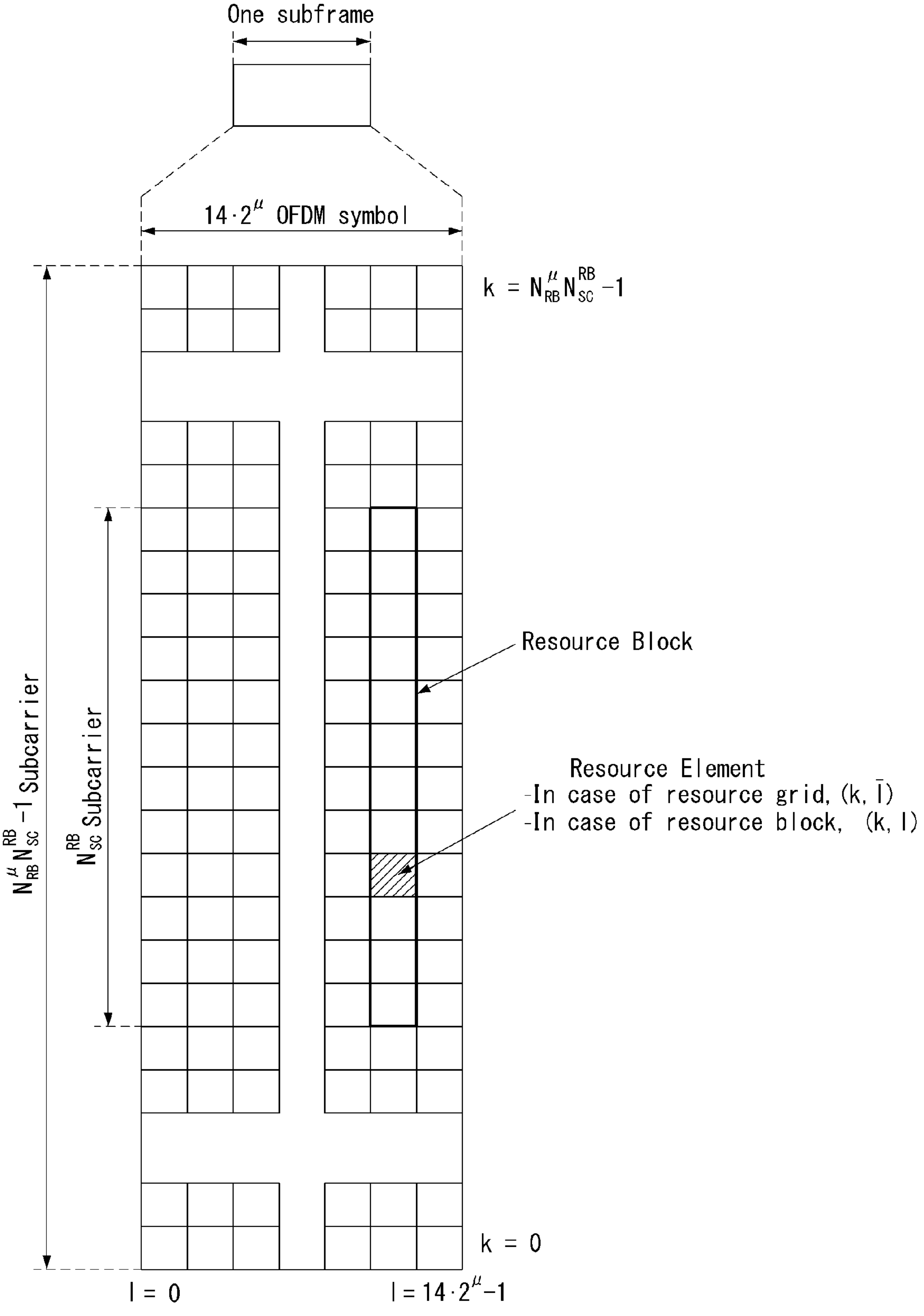
FIG. 3 illustrates an example of a resource grid supported in the wireless communication system to which a method described in the present disclosure is applicable.

FIG. 3 illustrates an example of a resource grid supported in a wireless communication system to which a method described in the present disclosure is applicable.

Referring to FIG. 3, a resource grid is composed of $N_{RB}^\mu N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \le N_{RB}^{max-\mu}$. The above $N_{RB}^{max,\mu}$ indicates the maximum transmission bandwidth, and it may change not just between numerologies, but between UL and DL.

Figure 4:
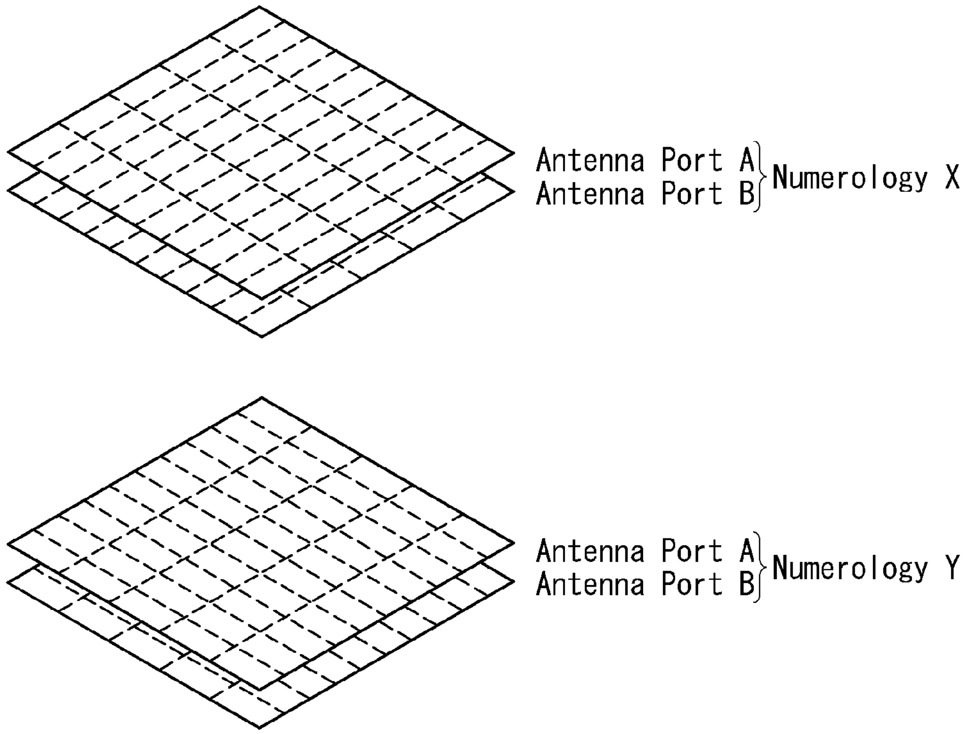
FIG. 4 illustrates examples of a resource grid per antenna port and numerology to which a method described in the present disclosure is applicable.

In this case, as illustrated in FIG. 4, one resource grid may be configured for the numerology μ and an antenna port p.

FIG. 4 illustrates examples of a resource grid per antenna port and numerology to which a method described in the present disclosure is applicable.

Each element of the resource grid for the numerology μ and the antenna port p is indicated as a resource element, and may be uniquely identified by an index pair $(k,\bar{l})$. Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair $(k,\bar{l})$ is used. Herein, $l=0, \ldots, N_{symb}^\mu-1$.

The resource element $(k,\bar{l})$ for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^\mu-1$ in the frequency region.

Uplink Control Channel

Physical uplink control signaling should be able to at least carry hybrid-ARQ acknowledgment, CSI report (including beamforming information if possible), and a scheduling request.

At least two transmission methods are supported for the UL control channel supported by the NR system.

The uplink control channel may be transmitted around a last transmitted uplink symbol(s) of a slot in short duration. In this case, the uplink control channel is time-division-multiplexed and/or frequency-division-multiplexed with an uplink (UL) data channel in the slot. One-symbol unit transmission of the slot is supported with respect to the uplink control channel of the short duration.

- Short uplink control information (UCI) and data are frequency-division-multiplexed at least between the UE and the UE in the case where the physical resource blocks (PRBs) for the short UCI and the data do not overlap.
- In order to support time division multiplexing (TDM) of short PUCCH from different UEs in the same slot, a mechanism for notifying to the UE whether the symbol(s) in the slot to transmit the short PUCCH is supported at least at 6 GHz or more is supported.
- With respect to 1-symbol duration, supported at least are 1) that when a reference signal (RS) is multiplexed, the UCI and the RS is multiplexed to a given OFDM symbol by a frequency division multiplexing (FDM) scheme and 2) that subcarrier spacings between downlink (DL) and uplink (UL) data and the short duration PUCCH are the same as each other in the same slot.
- At least, the short duration PUCCH during 2-symbol duration is supported. In this case, the subcarrier spacings between the downlink (DL) and uplink (UL) data and the short duration PUCCH are the same as each other in the same slot.
- At least, a semi-static configuration is supported, in which a PUCCH resource of the UE given in the slot, that is, short PUCCHs of different UEs may be time-division-multiplexed within given duration.
- The PUCCH resource includes a time domain and a frequency domain and if applicable, the PUCCH resource includes a code domain.
- The short duration PUCCH may be extended to the end of the slot from the viewpoint of the UE. In this case, after the short duration PUCCH, an explicit gap symbol is not required.
- In regard to a slot (that is, a DL-centric slot) having a short UL part, when data is scheduled in a short uplink part, 'short UCI' and data may be frequency-division-multiplexed by one UE.

The uplink control channel may be transmitted over multiple uplink symbols during long duration in order to improve coverage. In this case, the uplink control channel is frequency-division-multiplexed with the uplink data channel in the slot.

- At least, a UCI carried by a long duration UL control channel may be transmitted in one slot or multiple slots by a design with a low peak to average power ratio (PAPR).
- Transmission using multiple slots is allowed for a total duration (e.g., 1 ms) in at least some cases.
- For the long duration uplink control channel, time division multiplexing (TDM) between the RS and the UCI is supported with respect to DFT-S-OFDM.
- The long UL part of the slot may be used for transmitting the long duration PUCCH. That is, the long duration PUCCH is supported with respect to both a UL-only slot and a slot having symbols of a variable number constituted by a minimum of four symbols.
- At least with respect to a 1 or 2-bit UCI, the UCI may be repeated in N (N>1) slots and the N slots may be adjacent or not adjacent in slots in which the long duration PUCCH is allowed.
- At least, simultaneously transmission of the PUSCH and the PUCCH is supported with respect to a long PUCCH. That is, even when there is data, the uplink control for the PUCCH resource is transmitted. Further, in addition to the simultaneous transmission of the PUCCH and the PUSCH, the UCI in the PUSCH is supported.
- Intra-TTI slot frequency hopping is supported.
- A DFT-s-OFDM waveform is supported.
- A transmit antenna diversity is supported.

TDM and FDM between the short duration PUCCH and the long duration PUCCH are supported for other UEs in at least one slot. In the frequency domain, the PRB (or multiple PRBs) is the minimum resource unit size for the UL control channel. When hopping is used, frequency resources and hopping may not spread to a carrier bandwidth. Further, a UE-specific RS is used for NR-PUCCH transmission. A set of PUCCH resources is configured by higher layer signaling and the PUCCH resources within the configured set are indicated by downlink control information (DCI).

As part of the DCI, the timing between data reception and hybrid-ARQ acknowledgment transmission should be dynamically (at least together with RRC) indicated. A combination of the semi-static configuration and dynamic signaling (for at least some types of UCI information) is used to determine the PUCCH resource for 'long and short PUCCH formats'. Here, the PUCCH resource includes the time domain and the frequency domain and, if applicable, the PUCCH resource includes the code domain. Using UCI on the PUSCH, that is, a part of the scheduled resource for the UCI is supported in the case of simultaneous transmission of the UCI and the data.

Further, at least a single HARQ-ACK bit uplink transmission is supported at least. In addition, a mechanism is supported, which enables the frequency diversity. Further, in the case of Ultra-Reliable and Low-Latency Communication (URLLC), a time interval between scheduling (SR) resources configured for the UE may be smaller than one slot.

Beam Management

In NR, beam management is defined as follows.

Beam management: A set of L1/L2 procedures for obtaining and maintaining a set of TRP(s) and/or UE beams that may be used for DL and UL transmission/reception, including at least:

- Beam determination: operation of the TRP(s) or the UE selecting transmission/reception beam thereof
- Beam measurement: operation of the TRP(s) or the UE selecting transmission/reception beam thereof
- Beam reporting: operation in which the UE reports information of a beamformed signal based on beam measurement.
- Beam sweeping: operation of covering a spatial region using a transmitted and/or received beam for a time interval in a predetermined scheme.

Further, Tx/Rx beam correspondence in the TRP and the UE is defined as follows:

The Tx/Rx beam correspondence in the TRP is maintained if at least one of the followings is satisfied:

The TRP may determine a TRP reception beam for uplink reception based on the UE's downlink measurement for one or more transmission beams of the TRP.

The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

An ability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. Here, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting, M≥1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating the selected beam

L1 measurement reporting

Time domain operation (e.g., aperiodic operation, periodic operation, semi-persistent operation)

Frequency granularity when multiple frequency granularities are supported

Resource setting that includes at least:

Time domain operation (e.g., aperiodic operation, periodic operation, semi-persistent operation)

RS type: at least NZP CSI-RS

At least one CSI-RS resource set. Each CSI-RS resource set includes K≥1 CSI-RS resources (Some parameters of K CSI-RS resources may be the same. For example, port number, a time domain operation, density, and periodicity)

Further, NR supports a next beam report considering L group with L>1.

Information indicating minimal groups

Measurement quantity (L1 RSRP and CSI reporting support (when the CSI-RS is for CSI acquisition)) for N1 beam If applicable, information indicating N1 DL transmission beams The group-based beam reporting as described above may be configured on a UE-by-UE basis. Further, the group-based beam reporting may be turned off on the UE-by-UE basis (e.g., when L=1 or N1=1).

NR supports that UE may trigger a mechanism to recover from the beam failure.

A beam failure event occurs when a quality of a beam pair link of an associated control channel is sufficiently low (e.g., a comparison with a threshold, a timeout of an associated timer). The mechanism to recover the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. Here, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, this information also indicates the RS antenna port QCLed with the DMRS antenna port. A different set of DMRS antenna ports for a DL data channel may be represented as a different set of RS antenna ports and a QCL.

Hybrid Beamforming

Conventional beamforming techniques using multiple antennas may be classified into an analog beamforming technique and a digital beamforming technique depending on a location of applying a beamforming weight vector/precoding vector.

The analog beamforming technique is a beamforming technique applied to an initial multi-antenna structure. The technique may mean a technique of forming the beam by branching an analog signal that has been subjected to digital signal processing to multiple paths and applying phase shift (PS) and a power amplifier (PA) configuration to each path.

For analog beamforming, a structure is required in which the PA and the PS connected to each antenna process analog signals derived from a single digital signal. In other words, in an analog stage, the PA and the PS process complex weights.

Figure 5:
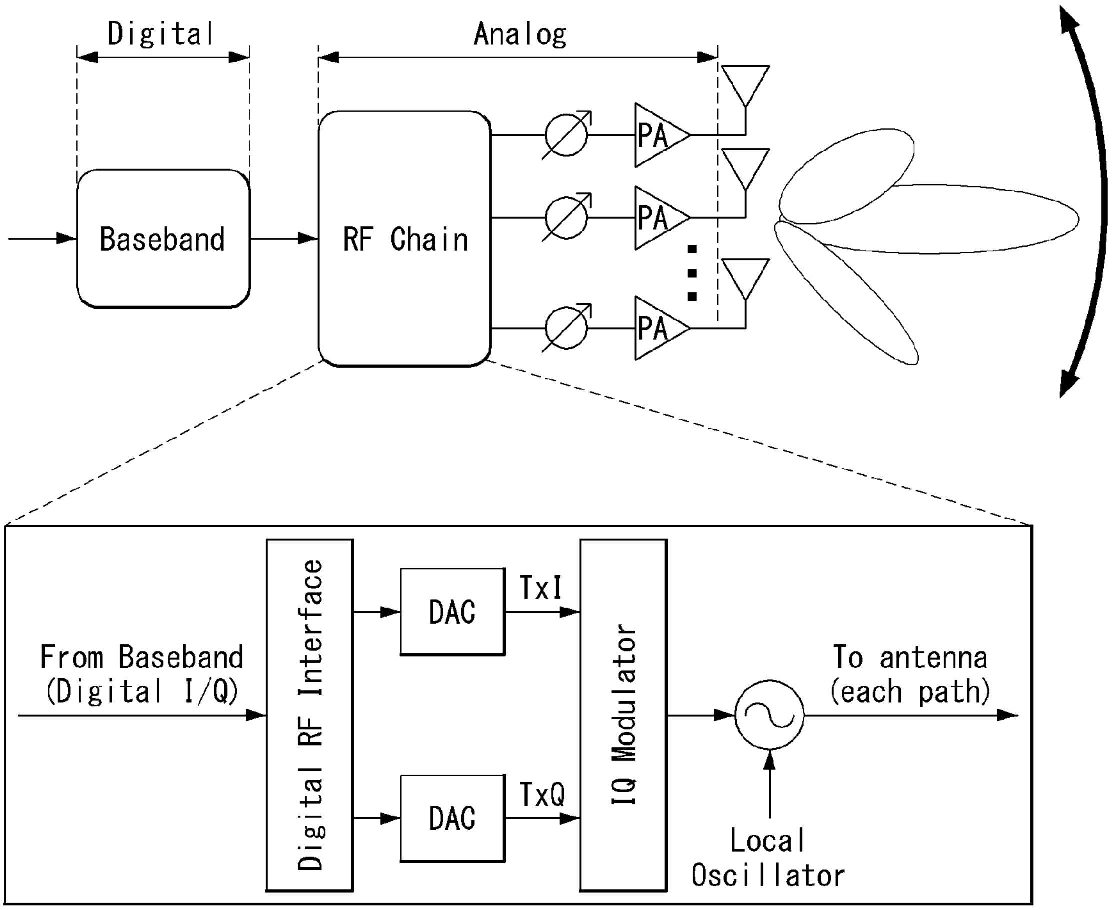
FIG. 5 illustrates an example of a block diagram of a transmitter constituted by an analog beamformer and an RF chain.

FIG. 5 illustrates an example of a block diagram of a transmitter constituted by an analog beamformer and an RF chain. FIG. 5 is just for convenience of the description and does not limit the scope of the present disclosure.

In FIG. 5, an RF chain refers to a processing block in which a baseband (BB) signal is converted into an analog signal. In the analog beamforming technique, accuracy of the beam is determined according to element characteristics of the PA and the PS and may be advantageous for narrowband transmission due to control characteristics of the elements.

Further, since the analog beamforming technique is configured in a hardware structure in which it is difficult to implement multi-stream transmission, a multiplexing gain for increasing transmission rate is relatively small. In addition, in this case, beamforming for each UE based on orthogonal resource allocation may not be easy.

In contrast, in the case of the digital beamforming technique, the beamforming is performed at a digital stage using a Baseband (BB) process in order to maximize diversity and the multiplexing gain in an MIMO environment.

Figure 6:
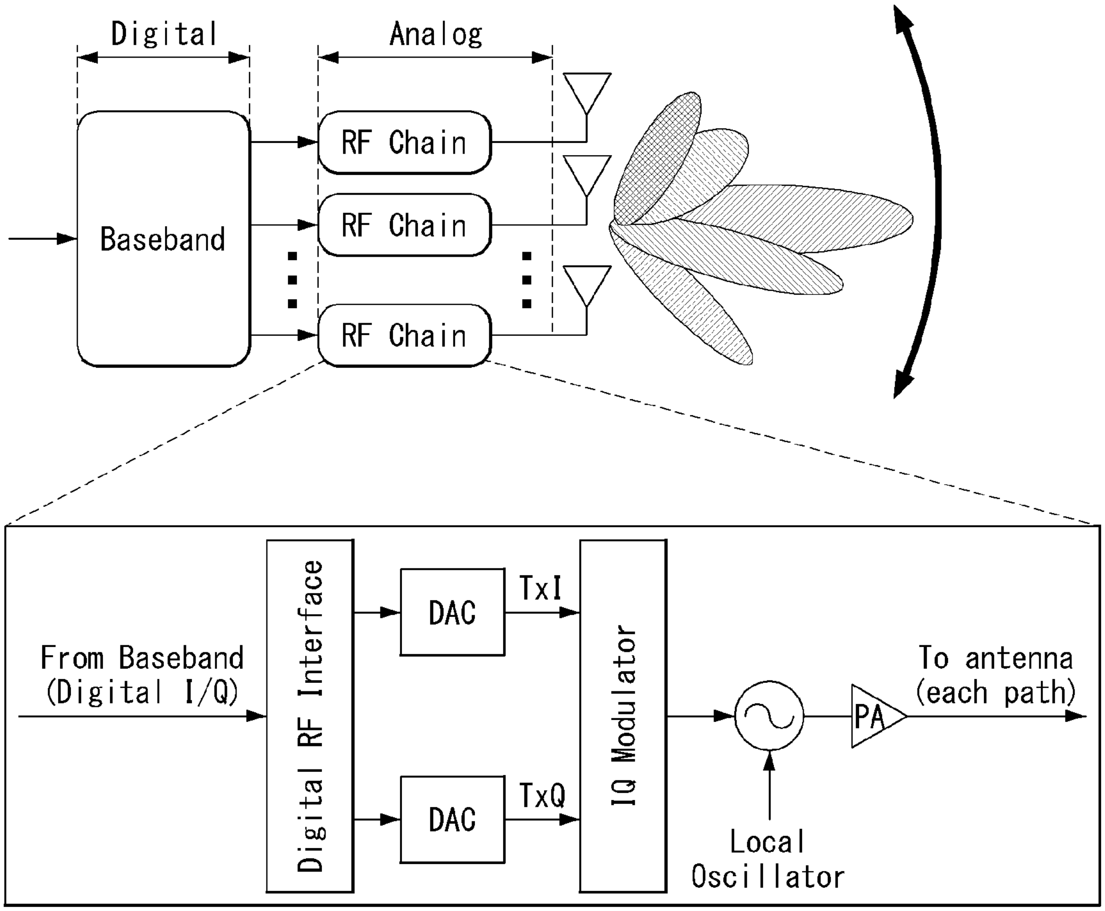
FIG. 6 illustrates an example of a block diagram of a transmitter constituted by a digital beamformer and an RF chain.

FIG. 6 illustrates an example of a block diagram of a transmitter constituted by a digital beamformer and an RF chain. FIG. 6 is just for convenience of the description and does not limit the scope of the present disclosure.

In the case of FIG. 6, the beamforming may be performed as precoding is performed in the BB process. Here, the RF chain includes the PA. The reason is that in the case of the digital beamforming technique, the complex weight derived for the beamforming is directly applied to transmitted data.

In addition, since different beamforming may be performed for each UE, it is possible to support multi-user beamforming at the same time. Moreover, independent beamforming is possible for each UE to which orthogonal resources are allocated, so that flexibility of scheduling is enhanced, and thus, the transmitter corresponding to a system objective may be operated. Further, when a technique such as MIMO-OFDM is applied in an environment supporting wideband transmission, an independent beam may be formed for each subcarrier.

Therefore, the digital beamforming technique may maximize maximum transmission rate of a single UE (or user) based on a capacity increase of the system and an enhanced beam gain. Based on features described above, the conventional 3G/4G (e.g., LTE(-A)) system introduces a digital beamforming based MIMO scheme.

In the NR system, a massive MIMO environment in which the number of transmission/reception antennas greatly increases may be considered. Generally, in cellular communication, it is assumed that the maximum number of transmission/reception antennas applied to the MIMO environment is eight. However, as a large MIMO environment is considered, the number of the transmission/reception antennas may increase to several tens or several hundreds.

In this case, when the digital beamforming technique described above is applied in the large MIMO environment, the transmitter must perform signal processing for hundreds of antennas through the BB process for digital signal processing. Accordingly, complexity of the signal processing becomes very large and the RF chains as many as the antennas are required, so that the complexity of hardware implementation may also greatly increase.

Further, the transmitter needs independent channel estimation for all of the antennas. In addition, in the case of the FDD system, the transmitter requires feedback information on a large MIMO channel constituted by all of the antennas, so that pilot and/or feedback overhead may be very large.

On the other hand, when the analog beamforming technique described above is applied in the large MIMO environment, the hardware complexity of the transmitter is relatively low.

In contrast, a degree of increase in performance using multiple antennas is very small and flexibility of resource allocation may be reduced. In particular, it is not easy to control the beam for each frequency in broadband transmission.

Therefore, in the large MIMO environment, a hybrid type transmitter configuration scheme in which analog beamforming and digital beamforming structures are combined is required instead of selecting only one of the analog beamforming and digital beamforming techniques exclusively.

Analog Beam Scanning

In general, THE analog beamforming may be used at a pure analog beamforming transceiver and at a hybrid beamforming transceiver. In this case, the analog beam scanning may perform estimation for one beam at the same time. Thus, a beam training time required for beam scanning is proportional to the total number of candidate beams.

As described above, in the case of the analog beamforming, a beam scanning process in the time domain is particularly required for the transceiver beam estimation. In this case, an estimated time is for all transmission/reception beams may be expressed as Equation 2 below.

$$T_S = t_s \times (K_T \times K_R) \quad \text{[Equation 2]}$$

In Equation 2, $t_s$ denotes a time required for scanning one beam, $K_T$ denotes the number of transmission beams, and $K_R$ denotes the number of reception beams.

Figure 7:
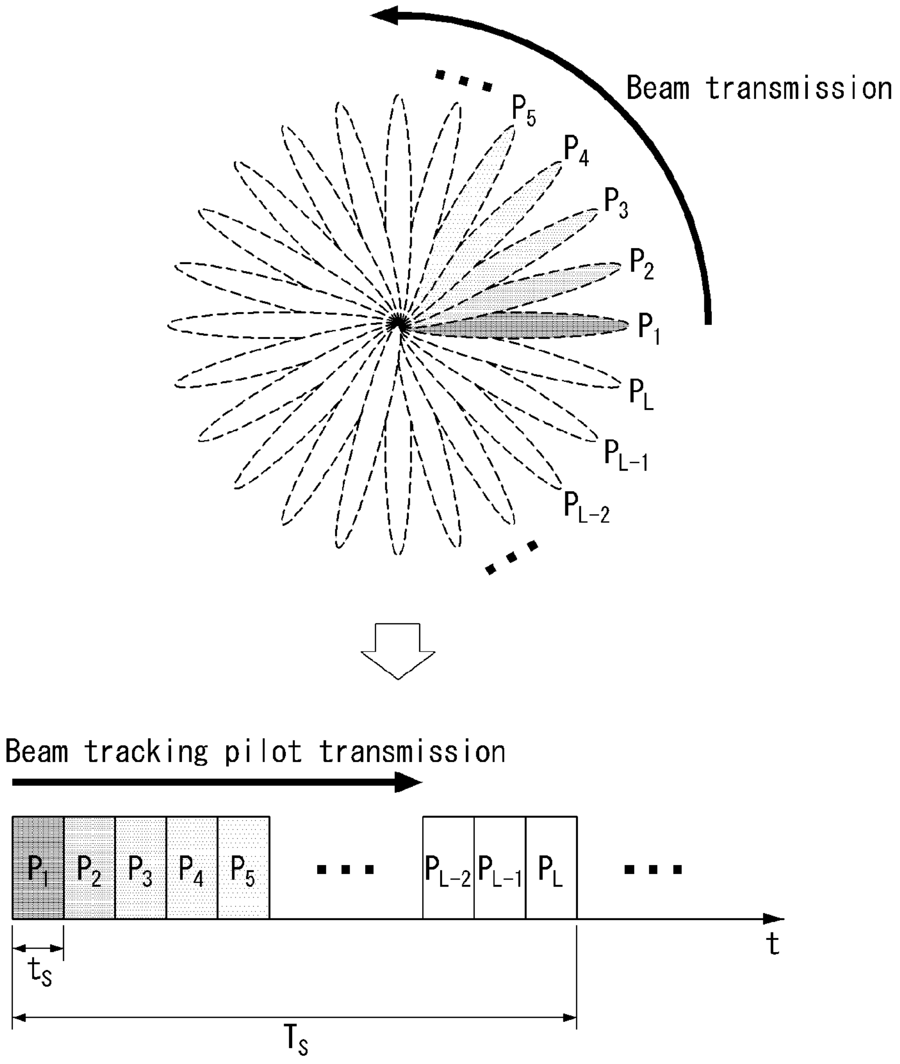
FIG. 7 illustrates an example of an analog beam scanning scheme.

FIG. 7 illustrates an example of an analog beam scanning scheme according to various embodiments of the present disclosure. FIG. 7 illustrates merely an example for convenience of explanation and does not limit the scope of the present disclosure.

In the case of FIG. 7, it is assumed that the total number KT of transmission beams is L and the total number KR of reception beams is 1. In this case, since the total number of candidate beams is L, the L time intervals are required in the time domain.

In other words, since only one beam may be estimated in a single time interval for the analog beam estimation, as illustrated in FIG. 7, L time intervals are required to estimate all L beams P1 to PL. After the analog beam estimation procedure ends, the UE feeds back an identifier (e.g., ID) of a beam having a highest signal strength to the base station. That is, as the number of transmission/reception antennas increases, the number of individual beams increases, and as a result, a longer training time may be required.

Since the analog beamforming changes a size and a phase angle of a continuous waveform in the time domain after a digital-to-analog converter (DAC), training intervals for individual beams need to be guaranteed unlike the digital beamforming. Therefore, as the length of the training interval increases, efficiency of the system may decrease (i.e., loss of the system may increase).

Channel State Information (CSI) Feedback

In most cellular systems including the LTE system, the UE receives a pilot signal (reference signal) for channel estimation from the base station and calculates channel state information (CSI) and reports the calculated CSI to the base station.

The base station transmits a data signal based on the CSI information fed back from the UE.

In the LTE system, the CSI information fed back by the UE includes channel quality information (CQI), a precoding matrix index (PMI), and a rank indicator (RI).

CQI feedback is radio channel quality information provided to the base station for a purpose (link adaptation purpose) to provide a guide as to which modulation and coding scheme is to be applied when the base station transmits data.

When a radio quality between the base station and the UE is high, the UE will feed back a high CQI value and the base station will transmit data using a relatively high modulation order and low channel coding rate and in an opposite case, the UE will feed back a low CQI value and the base station will transmit data by applying a relatively low modulation order and high channel coding rate.

PMI feedback is preferred precoding matrix information provided to the base station in order to provide a guide as to which MIMO precoding scheme is to be applied when the base station has multiple antennas installed therein.

The MS estimates a downlink MIMO channel between the base station and the UE based on the pilot signal and recommends what MIMO precoding the BS should apply through the PMI feedback.

In the LTE system, only linear MIMO precoding which may be expressed in a matrix form is considered in the PMI configuration.

The base station and the UE share a codebook constituted by multiple precoding matrices and each MIMO precoding matrix in the codebook has a unique index.

Accordingly, the UE minimizes an amount of the feedback information of the UE by feeding back an index corresponding to a most preferred MIMO precoding matrix in the codebook as the PMI.

The PMI value is not particularly configured by only one index. As an example, when the number of transmission antenna ports is eight in the LTE system, a final 8tx MIMO precoding matrix may be derived only by combining two indexes (first PMI and second PMI).

RI feedback is information on the number of preferred transmission layers which the UE provides to the base station in order to provide a guide for the number of preferred transmission layers when multi-layer transmission is possible through spatial multiplexing by installing multiple antennas by the base station and the UE.

The RI has a very close relationship with the PMI. The reason is that the base station must be able to know what precoding should be applied to each layer according to the number of transmission layers.

In the PMI/RI feedback configuration, a PMI codebook may be configured based on single layer transmission and then, the PMI may be defined and fed back for each layer, but this scheme is disadvantageous in that the amount of the PMI/RI feedback information increases significantly as the number of transmission layers increases.

Therefore, in the LTE system, the PMI codebook is defined according to the number of transmission layers. That is, N matrices having a size of Nt×R are defined in the codebook for R-layer transmission (here, R represents the number of layers, Nt represents the number of transmission antenna ports, and N represents the size of the codebook).

Therefore, in the LTE, the size of the PMI codebook is defined regardless of the number of transmission layers. As a result, when the PMI/RI is defined in such a structure, the number R of transmission layers consequently matches a rank value of the precoding matrix (Nt×R matrix), and as a result, a term rank indicator (RI) is used.

The PMI/RI described in the present disclosure is not limited to meaning an index value of the precoding matrix and a rank value of the precoding matrix expressed by the Nt×R matrix like the PMI/RI in the LTE system.

The PMI described in the present disclosure represents preferred MIMO precoder information among MIMO precoders applicable in the transmitter and the form of the precoder is not limited to a linear precoder that may be expressed by a matrix as in the LTE system. In addition, the RI described in the present disclosure includes all of the feedback information indicating the number of preferred transmission layers in a wider sense than the RI in the LTE.

CSI information may be obtained in an entire system frequency domain or in a partial frequency domain. In particular, it may be useful in the broadband system to obtain and feed back the CSI information for the partial frequency domain (e.g., subbands) preferred for each UE.

In the LTE system, the CSI feedback is performed through an uplink channel and in general, periodic CSI feedback is performed through a physical uplink control channel (PUCCH) and aperiodic CSI feedback is performed through a physical uplink shared channel (PUSCH) which is an uplink data channel.

The aperiodic CSI feedback means that the base station temporarily feeds back only when the base station desires the CSI feedback information and the base station triggers the CSI feedback through a downlink control channel such as the PDCCH/ePDCCH.

In the LTE system, when the CSI feedback is triggered, what information the UE should feed back is divided into a PUSCH CSI reporting mode as illustrated in FIG. 8 and in what PUSCH CSI reporting mode the UE should operate is known to the UE through a higher layer message in advance.

FIG. 8 is a diagram illustrating an example of a PUSCH CSI reporting mode.

The PUSCH CSI reporting mode is also defined for the periodic CSI feedback through the PUCCH.

FIG. 9 is a diagram illustrating an example of a PUCCH CSI reporting mode.

In the case of THE PUCCH, it is difficult to send the CSI information to be sent at a time because a data amount (payload size) which may be sent at a time is smaller than the data amount in the PUSCH.

Therefore, a time of transmitting the CQI and the PMI and a time of transmitting the RI are different according to each CSI reporting mode. For example, in reporting mode 1-0, only the RI is transmitted at a specific PUCCH transmission time and wideband CQI is transmitted at another PUCCH transmission time. A PUCCH reporting type is defined according to a type of CSI information configured at the specific PUCCH transmission time. For example, in the above example, a reporting type in which only the RI is transmitted corresponds to type 3 and a reporting type in which only the wideband CQI is transmitted corresponds to type 4. An RI feedback period and an offset value and a CQI/PMI feedback period and an offset value are configured in the UE through the higher layer message.

The CSI feedback information is included in uplink control information (UCI).

Reference signals in LTE

The purpose of the pilot or reference signal (RS) in the LTE system may be largely divided into the followings.

1. Measurement RS: Pilot for measuring channel state

A. CSI measurement/reporting purpose (short term measurement): purposes including Link adaptation, rank adaptation, closed loop MIMO precoding, etc.

B. Long term measurement/reporting purpose: purposes including handover, cell selection/reselection, etc.

2. Demodulation RS: pilot for receiving physical channel

3. Positioning RS: pilot for estimating position of UE

4. MBSFN RS: pilot for multi-cast/broadcast service

In LTE Rel-8, cell-specific RS (CRS) is used for measurement (purpose 1A/B) and demodulation (purpose 2) for most downlink physical channels, but in order to solve an RS overhead problem depending on an increase in number of antennas, the CSI-RS is used exclusively for CSI measurement (purpose 1A) and the UE-specific RS is used exclusively for reception (purpose 2) of the downlink data channel (PDSCH) from LTE Advanced (Rel-10).

The CSI-RS as RS designed for CSI measurement and feedback only is characterized in that the CSI-RS has still lower RS overhead than the CRS and it is designed so that the CRS supports up to four multi-antenna ports, while the CSI-RS supports up to eight multi-antenna ports. The UE-specific RS is designed to be dedicated to demodulation of the data channel, and it is characterized in that the UE-specific RS is a precoded RS in which the MIMO precoding scheme applied when data is transmitted to the corresponding UE is applied to the pilot signal unlike the CRS.

Therefore, UE-specific RSs need not be transmitted as large as the number of antenna ports and may be transmitted only as large as the number (transmission rank) of transmission layers.

Further, since the UE-specific RS is transmitted for a purpose of receiving the data channel of the corresponding UE to a resource region which is the same a data channel resource region allocated to each UE through a scheduler of the base station, it is characterized in that the UE-specific RS is the UE-specific RS.

Since the CRS is continuously transmitted in the same pattern in a system bandwidth so as to be used for measurement and demodulation purposes by all UEs in the cell, the CRS is cell-specific.

In LTE uplink, a sounding RS (SRS) is designed as a measurement RS, and a demodulation RS (DMRS) for demodulation for the uplink data channel (PUSCH) and a DMRS for the uplink control channel (PUCCH) for ACK/NACK and CSI feedback are respectively designed.

Beam Management and Beam Recovery

The base station may request to the UE the periodic CSI report, the semi-persistent CSI report (periodic CSI reporting is activated only during a specific time interval or a plurality of consecutive CSI reports is performed), or the aperiodic CSI report.

Here, in the periodic and semi-persistent (SP) CSI reporting, an uplink resource (e.g., PUCCH in LTE) for the CSI reporting at a specific period is allocated to the UE during a period during which reporting is activated.

For CSI measurement of the UE, transmitting a downlink (DL) reference signal (RS) of the base station is required.

In a beamformed system to which the (analog) beamforming is applied, determining a DL transmission (Tx)/reception (Rx) beam pair for the DL RS transmission/reception and a UL Tx/Rx beam pair for uplink control information (UCI) (e.g., CSI, ACK/NACK) transmission/reception are required.

A determination procedure of the DL beam pair may be configured by a combination of (1) a procedure in which the base station transmits DL RSs corresponding to a plurality of TRP Tx beams to the UE, (2) a TRP Tx beam selection procedure in which the UE selects and/or reports one of the DL RSs, (3) a procedure in which the base station repeatedly transmits the same RS signal corresponding to each TRP Tx beam, and (4) a procedure in which the UE measures the repeatedly transmitted signals with different UE Rx beams to select a UE Rx beam.

Further, a determination procedure of the UL beam pair may be configured by a combination of (1) a procedure in which the UE transmits UL RSs corresponding to a plurality of UE Tx beams to the base station, (2) a UE Tx beam selection procedure in which the base station selects and/or signals one of the UL RSs, (3) a procedure in which the UE repeatedly transmits the same RS signal corresponding to each UE Tx beam to the base station, and (4) a procedure in which the base station measures the repeatedly transmitted signals with different TRP Rx beams to select a TRP Rx beam.

If DL/UL beam reciprocity (or beam correspondence) is established, i.e., assuming that a base station DL Tx beam and a base station UL Rx beam match and the UE UL Tx beam and a UE DL Rx beam match in communication between the base station and the UE, when only any one of the DL beam pair and the UL beam pair is determined, a procedure of determining the other one can be omitted.

A process of determining the DL and/or UL beam pair may be performed periodically or aperiodically.

When the number of candidate beams is large, required RS overhead may be large, and as a result, it is not preferable that the process of determining the DL and/or UL beam pair frequently occurs.

It is assumed that after the process of determining the DL and/or UL beam pair is completed, the UE performs periodic or semi-persistent (SP) CSI reporting.

Here, the CSI-RS including a single or a plurality of antenna ports for CSI measurement of the UE may be beamformed and transmitted to the TRP Tx beam determined as the DL beam, and a transmission period of the CSI-RS may be equal to or the CSI reporting period of the CSI or the CSI-RS may be more frequently transmitted than the CSI.

Alternatively, the UE may transmit the aperiodic CSI-RS in accordance with the CSI reporting period or more frequently.

The UE (e.g., UE) may periodically transmit the measured CSI information with the UL Tx beam predetermined in the UL beam pair determination process.

A beam mismatch problem may occur according to a period of beam management set in performing the DL/UL beam management process.

In particular, when the UE changes its position, the UE rotates, or a radio channel environment is changed due to movement of a peripheral object of the UE (for example, when a line-of-sight (LoS) environment is changed to a non-LoS environment by blocking of the beam), an optimal DL/UL beam pair may be changed.

In the case of such a change, it may be generally said that a beam failure event occurs when tracking is unsuccessful by the beam management process performed by the network instruction.

The UE may determine whether the beam failure event occurs through a reception quality of the downlink RS, and a reporting message for such a situation or a message for a beam recovery request (hereinafter, referred to as a 'beam recovery request message') should be delivered from the UE.

The beam recovery request message may be variously expressed as a beam failure recovery request message, a control signal, a control message, a first message, and the like.

The base station that receives the beam recovery request message from the UE can perform the beam recovery through various processes including beam RS transmission to the UE, a beam reporting request, and the like.

A series of beam recovery process described above will be expressed as a 'beam recovery'.

Standardization of a new communication system called new radio or new rat (NR) has been under way since LTE in 3GPP and the following contents related to the beam management are included.

(Content 1)

The NR supports that UE may trigger a mechanism to recover the beam failure.

The network explicitly configures resources for UL transmission of signals in the UE for recovery purpose.

Configurations of resources are supported where the base station is listening from all or partial directions (e.g., random access region).

(To be discussed later) Trigger condition of recovery signal (new or existing signal) related to UE operation of RS/control channel/data channel monitoring The transmission of the DL signal is supported, which permits the UE to monitor the beam to identify new potential beams.

(To be discussed later) transmission of a beam sweep control channel is not excluded.

The mechanism needs to consider a tradeoff between performance and DL signaling overhead.

(Content 2)

Considering possible candidate solutions below, beam management overhead and a delay time should be considered during CSI-RS design for NR beam management.

Opt1. IFDMA

Opt2. large subcarrier spacing

Other aspects considered during CSI-RS design for NR beam management include, for example, CSI-RS multiplexing, UE beam switch latency and UE implementation complexity (e.g., AGC training time), coverage of the CSI-RS, etc.

(Content 3)

The CSI-RS supports DL Tx beam sweeping and UE Rx beam sweeping.

The NR CSI-RS supports the following mapping structure.

An NP CSI-RS port may be mapped for each (sub) time unit.

Throughout the (sub) time unit, the same CSI-RS antenna ports may be mapped.

Here, "time unit" represents n OFDM symbols (n>=1) in configured/reference numerology.

Each time unit may be partitioned into sub-time units.

The mapping structure may be used to support multiple panels/Tx chain.

(Option 1)

The Tx beam(s) are the same across the sub-time units within each time unit.

The Tx beam(s) depends on the time unit.

(Option 2)

The Tx beam(s) are different per sub-time unit within each time unit.

The Tx beam(s) are the same in the time units.

(Option 3): Combination of option 1 and option 2.

The Tx beam(s) are the same in the sub-time units within one time unit.

The Tx beam(s) are different per sub-time unit within different time units.

Hereinafter, a beam failure recovery mechanism of the UE will be briefly described.

The beam failure recovery mechanism of the UE includes processes (1) to (4) below.

(1) The beam failure is detected.

(2) A new candidate beam is identified.

(3) The beam failure recovery request is transmitted.

(4) The UE monitors a response of the gNB to the beam failure recovery request.

First, referring to a beam failure detection process, the UE monitors a beam failure detection RS to evaluate whether a beam failure trigger condition is satisfied.

In addition, the beam failure detection RS at least includes a periodic CSI-RS for beam management. Here, a Synchronization Signal (SS) block may also be used for beam management.

Here, the SS block may be interpreted as the synchronization signal SS being transmitted in a slot unit or a specific time unit.

Here, the beam failure detection RS includes a case of measuring the detection/demodulation quality of an associated radio channel using the RS and a Quasi Co-Location (QCL) indicator as well as measuring the quality of the corresponding RS. For example, a CSI-RS indicated for (primary) PDCCH monitoring or an ID associated with the SS block may be appreciated as the beam failure detection RS and in this case, whether the beam failure event occurs may be defined as a case where detection/demodulation performance of the corresponding PDCCH is equal to or less than predetermined performance.

The beam failure event may occur when the quality of the beam pair link(s) of the associated control channel falls to a certain level or less.

Specifically, the quality of the beam pair link(s) of the associated control channel may be determined as PDCCH detection performance.

For example, while the UE monitors the PDCCH (or blind decoding), if the PDCCH detection performance is poor as a result of a CRC check, the UE may detect the beam failure.

Alternatively, when multiple PDCCHs are transmitted through multiple beams (or multiple PDCCHs are transmitted with different beams), it is possible to determine whether the beam failure event occurs with detection performance for a specific PDCCH (e.g., PDCCH associated with a serving beam).

Here, the multiple PDCCHs may be transmitted and/or received for different beams in different control channel regions (e.g., symbols, slots, subframes, etc.), respectively.

In this case, the control channel region for each beam may be predefined or transmitted/received via the higher layer signaling.

Further, when it is determined whether the beam failure event occurs due to the quality of the beam pair link(s) of the associated control channel, it may be determined whether the beam failure event occurs according to whether only the quality of the DL beam falls to a certain level or less, whether only the quality of the UL beam falls to a certain level or less, or whether both of the qualities of the DL beam and the UL beam fall to a certain level or less.

Here, the certain level or less may be a threshold or less, time-out of the associated timer, etc.

In addition, BRS, RS for fine timing/frequency tracking, SS blocks for fine timing/frequency tracking, DM-RS for the PDCCH, DM-RS for the PDSCH, etc. may be used as a signal for detecting the beam failure.

Next, referring to a new candidate beam identification process, the UE monitors a beam identification RS to find a new candidate beam.

The beam identification RS includes information on 1) the periodic CSI-RS for beam management when configured by NW, and 2) the periodic CSI-RS and SS block in the serving cell when the SS block is used for beam management.

Next, referring to the beam failure recovery request transmission process, the information carried by the beam failure recovery request includes at least one of 1) explicit/implicit information for identifying UE and new gNB TX beam information or 2) explicit/implicit information as to whether the UE is identified and there is a new candidate beam.

Further, in transmission of the beam failure recovery request, one of PRACH, PUCCH, and PRACH-like (e.g., different parameters for a preamble sequence from the PRACH).

A beam failure recovery request resource/signal may be used additionally in a scheduling request.

Next, the UE monitors a control channel search space to receive a gNB response for the beam failure recovery request.

In addition, the following triggering conditions are supported for the transmission of the beam failure recovery request.

Condition: Case where the beam failure is detected and the candidate beam is identified when only the CSI-RS is used for new candidate beam identification In addition, the following channels are supported for the transmission of the beam failure recovery request.

A resource that is orthogonal to at least another PRACH transmission's resource is used with respect to a non-contention-based channel, FDM, based on PRACH.

PUCCH for the transmission of the beam failure recovery request is supported.

As described above, in the NR, two mechanisms may be all supported, which includes (1) a mechanism (first mechanism) in which a beam recovery request message is transmitted using the same symbols as PRACH and (2) a mechanism (second mechanism) in which the beam recovery request message is transmitted using symbols other than PRACH.

The first mechanism may be a useful mechanism when even uplink synchronization is lost due to the beam failure (when the beam quality is relatively low or there is no alternative beam) and/or when a predetermined PRACH resource is temporally close to a beam failure event occurrence time.

The second mechanism may be a useful mechanism in a situation of the beam failure or when the uplink synchronization is not lost (when the beam quality is relatively low or there is the alternative beam) and/or when the predetermined PRACH resource is temporally distant from the beam failure event occurrence time.

Further, when the UE transmits the beam recovery request message to the base station a predetermined number of times and thereafter, dos not receive a response to the request from the base station in the beam failure, the UE performs a radio link failure (RLF) operation.

When the beam failure occurs due to movement of the UE, a method for recovery the beam will be described.

In particular, in the present disclosure, the method for recovering the beam may be performed differently according to whether there is the alternative beam and detailed contents will be described below.

A beam reference signal (RS) (BRS) used in the present disclosure is a downlink physical signal used for beam management and the CSI-RS, mobility RS (MRS), a synchronization signal, etc. may be used as the beam BS.

The beam RS may be configured (as an RRC layer message) by resource setting on a beam management framework (or CSI framework). That is, the beam RS may be preconfigured by the resource setting.

As will be described later, the beam management framework is a structure that indicates a correlation between beam reporting setting(s), beam resource setting(s), beam resource set, and measurement setting(s). A more detailed description related thereto will be given later.

Further, beam reporting used in the present disclosure may mean feedback information of the UE related to the beam and may include beam quality related information and/or beam indication information.

In the present disclosure, the expression of 'A and/or B', 'A and/or B', and A/B' may be construed as the same meaning as 'including at least one of A or B'.

The beam quality related information may be Channel Quality Information (CQI), Layer 3 Reference Signals Received Power (RSRP), Layer 1 RSRP, etc.

The beam indication information may be a CSI-RS resource indicator (CRI), a Precoding Matrix Indicator (PMI), an RS port index, etc.

The feedback information, parameters, reporting period, frequency granularity (e.g., wideband feedback, subband feedback), etc., related to the beam may be configured as (RRC layer message) by reporting setting on the beam management framework (or CSI framework).

That is, the feedback information, the reporting period, the frequency granularity, etc., related to the beam may be preconfigured by the reporting setting.

When the UE transmits the beam recovery request to the network (e.g., base station), the network may take two operations (method 1 and method 2) as follows.

(Method 1)

Method 1 shows a network operation in the absence of the alternative beam (e.g., alternative DL beam pair).

That is, method 1 is a method for transmitting a (aperiodic) Beam RS to the UE (or triggering the beam RS) and transmitting a (aperiodic) Beam reporting trigger to the UE when the network receives the beam recovery request from the UE.

The alternative beam may be appreciated as an RS set which the base station configures for periodic beam management or monitoring and may be equal to or less than the set of the beam measurable by the UE.

That is, the alternative beam may be RS(s) having a specific quality or more among the RSs configured for the purpose of beam management.

For example, the network may configure N CSI-RS resources for periodic beam management or monitoring to the UE.

However, the UE may measure the signal quality from M beamformed SS blocks (with wider coverage) as well as M CSI-RS resources. Therefore, a UE does not have the alternative beam among N configured CSI-RSs, but may have the alternative beam, that is, a signal having a specific quality or more among M SS blocks. However, in this case, the SS block is cell-specific and has periodic properties, so the SS block is not suitable to be included in the above-described aperiodic Beam RS category which needs to be UE-specifically transmitted on-demand. Therefore, this case may be regarded as a category of method 1, which requires a subsequent process of transmitting a Beam RS (e.g., CSI-RS) to the UE, even if there is an alternative SS block beam.

FIG. 10 illustrates an example of a network operation depending on whether there is an alternative beam.

Specifically, FIG. 10*a* is a diagram illustrating method 1.

Here, the Beam RS trigger and the Beam reporting trigger may be independently signaled or jointly signaled.

As an example, the network may trigger Beam RS and Beam reporting together using one DCI.

Referring to FIG. 10*a*, the network transmits the periodic Beam RS to the UE through the DL.

Thereafter, when the network receives the beam recovery request from the UE, the network triggers the (aperiodic) Beam RS and the (aperiodic) beam reporting to the UE together (according to method 1).

Accordingly, the UE performs beam measurement through a reference resource and reports the beam measurement result to the network.

A specific method for determining the reference resource will be described later.

(Method 2)

Method 2 shows a network operation in the presence of an alternative DL beam pair.

That is, in method 2, when the network receives the beam recovery request from the UE, the network performs the (aperiodic) beam reporting trigger as illustrated in FIG. 10*b*.

FIG. 10*b* is a diagram illustrating method 2.

Referring to FIG. 10*b*, the network transmits the periodic Beam RS to the UE through the DL.

Thereafter, when the network receives the beam recovery request from the UE, the network triggers the (aperiodic) Beam reporting to the UE.

Here, unlike method 1, in method 2, since the UE knows the alternative DL beam pair, the network does not (or does not trigger) the aperiodic Beam RS to the UE.

Accordingly, the UE performs beam measurement through the reference resource and reports the beam measurement result to the network.

Here, a preferred Tx beam indicator and a beam quality metric may be transmitted together in the beam reporting process. A detailed description thereof will be described below.

As described above, method 2 is a useful scheme since beam RS transmission of the network and beam RS reception of the UE can be omitted when the UE knows information on the DL Tx beam (or DL beam pair) which may be replaced from a channel measured through a predetermined RS.

In contrast, method 1 described above is a useful method when there is no alternative beam or when the base station cannot know the information on the presence or absence of the alternative beam.

Further, for method 1 and method 2, the (beam) reporting setting may not be distinguished.

That is, in method 1 and method 2, beam reporting may constitute the same feedback information, have the same time domain behavior (e.g., aperiodic reporting) of the UE, and have the same frequency-side granularity.

The same feedback information may include, for example, a preferred DL Tx beam indicator(s) and a beam quality metric(s).

The preferred DL Tx beam indicator may be, for example, beam ID, CSI-RS Resource Indicator (CRI), RS port index, etc.

The beam quality metric may be, for example, L1 RSRP, CQI, etc.

In the beam recovery method, the network may support at least one of the following configuration schemes to the UE via RRC signaling.

FIG. 11 is a diagram illustrating an example of a beam related configuration method.

(Setting Method 1)

Referring to FIG. 11*a*, the reporting setting may include one aperiodic CSI/beam reporting setting and the resource setting may include one aperiodic beam RS setting (e.g., CSI-RS) and one periodic/semi-persistent beam RS setting.

Here, a plurality of reporting settings may be expressed as reporting settings and the like and a plurality of resource settings may be expressed as resource settings and the like.

Further, the resource setting may include one or more resource sets.

Referring to FIG. 11*a*, it can be seen that one reporting setting and two resource settings are connected by a link (or channel) in a measurement setting.

(Setting Method 2)

Referring to FIG. 11*b*, the reporting setting includes one aperiodic CSI/beam reporting setting, the resource setting includes one beam RS setting, and the beam RS setting includes at least two resource sets as described above.

Resource set with aperiodic beam RS(s) (e.g., CSI-RS)

Resource set with periodic/semi-persistent beam RS(s) (e.g., CSI-RS)

In addition, the two settings (reporting setting and resource setting) are connected by one link (or channel) in the measurement setting.

As described above, setting method 1 is useful when a time-domain behavior (aperiodic, semi-persistent (SP), periodic) is commonly configured per resource setting.

In addition, setting method 2 may be useful when the time-domain behavior is commonly configured per resource set within the resource setting.

Next, a method is described in detail, which informs the network (or base station) of information on which of the method 1 and the method 2 the UE prefers or information on the presence or absence of an alternative beam (or the presence or absence of a measurement value) from a pre-measured RS.

Information on which method is preferred or information on the presence or absence of the alternative beam which the UE transmits to the network will be expressed below as ‘control information’.

Here, the control information may be included in a beam recovery request signal or a beam failure reporting signal.

The control information may be an indicator or indication information that directly indicates the presence or absence of the alternative beam, preferred link information associated with the pre-configured aperiodic beam reporting setting (in the case of setting method 1), preferred resource setting information (in the case of setting method 1), or preferred resource set information (in the case of setting method 2).

The control information may be delivered to the network as physical layer control information such as uplink control information (UCI) in the LTE system, or may be delivered in a higher layer message format (e.g., MAC CE).

In particular, the UE may transmit the control information using the same resource (e.g., symbol(s)) as the PRACH.

When the UE uses (or transmits) a signal Code Division Multiplexed (CDM) or Frequency Division Multiplexed (FDM) with the PRACH as the beam recovery request signal, a sequence set used in the PRACH may be separately used according to the presence or absence of the alternative beam.

For example, when the sequence set used in the PRACH is separately used, a separated root index(es) or cyclic shift values may be used.

Alternatively, when the UE uses the signal Code Division Multiplexed (CDM) or Frequency Division Multiplexed (FDM) with the PRACH as the beam recovery request signal, a sequence set which is the same as the sequence set used in the PRACH may be used. However, in this case, whether the signal is the PRACH or the beam recovery request signal may be discriminated by applying different time-domain/frequency-domain Orthogonal Cover Codes (OCCs).

When the network (or the base station) instructs the UE to perform aperiodic reporting triggering with a control element (MAC), which is the higher layer message and/or downlink control information (DCI) which is the physical layer message, at least one of information (1) to (4) below may be included.

(1) Information on a valid/invalid Link within the pre-associated settings (in the case of setting method 1)

: The UE determines as the reference resource only the RS included in the resource setting indicated by the valid link (or not indicated by the invalid link) among a plurality of pre-associated resource settings as the measurement setting and performs beam measurement and beam reporting for the beam measurement.

(2) Information on a Valid/invalid Resource setting within the pre-associated settings (in the case of setting method 2)

: The UE determines as the reference resource only the RS included in the valid resource setting (or not included in the invalid resource setting) among the plurality of resource settings pre-associated as the measurement setting and performs the beam measurement and the beam reporting.

(3) Information ON a valid/invalid resource set in the pre-associated resource setting (in the case of setting method 2)

: The UE determines as the reference resource only the RS included in the valid resource set within the resource setting pre-associated as the measurement setting and performs the beam measurement and the beam reporting.

(4) Reporting type/mode setting information (applied to both setting method 1 and setting method 2)

: The reporting type/mode setting information indicates an indicator or indication information indicating whether triggering of the aperiodic resource and triggering of the aperiodic report are indicated together or only the aperiodic report triggering is indicated.

The reporting type or mode when the triggering of the aperiodic resource and the triggering of the aperiodic report are indicated together may be expressed as a joint triggering mode or a first mode and the reporting type or mode when only the aperiodic report triggering is indicated may be expressed as a reporting triggering only mode or a second mode.

In the case of the joint triggering mode (or first mode), the UE determines as the reference resource only the aperiodic resource setting/resource set between a resource setting (setting method 1) or a resource set (setting method 2) configured as the RRC and performs the beam measurement and the beam reporting.

That is, the UE ignores the periodic resource/semi-stationary resource connected to the aperiodic reporting.

In addition, in the case of reporting triggering only mode (or second mode), the UE determines as the reference resource only the periodic or semi-persistent resource setting/resource set between the resource setting (setting method 2) or the resource set (setting method 2) configured as the RRC and performs the beam measurement and the beam reporting.

That is, the UE ignores the aperiodic resource connected to the aperiodic reporting.

In addition, when the UE reports to the base station information on which of methods 1 and 2 the UE prefers or information on the presence or absence of the alternative beam (or the presence or absence of a measured value) from a pre-measured RS, the base station may transmit to the UE information (confirmation message or ACK/NACK) indicating whether to apply report information of the UE.

When the report information of the mobile station is transmitted to the base station before indicating the aperiodic reporting triggering of the base station, the information indicating whether to the report information of the UE may be transmitted together information (1) to (4) described above when indicating the aperiodic reporting triggering.

When the UE transmits the information on which of methods 1 and 2 is preferred by the UE or the information on the presence or absence of the alternative beam (or the presence or absence of a measured value) from the pre-measured RS, the base station may transmit to the UE information for confirming reception and application of the corresponding information.

For example, when the base station transmits the confirmed (or ACK) message to the UE, the transmission of the confirmed message indicates that the base station confirms that the information transmitted by the UE is to be applied by the base station.

Alternatively, when the base station does not transmit the confirmed message or transmits a not-confirmed (or NACK) message to the UE, the base station may request the UE to additionally retransmit some information of information (1)

to (4) described above or allow the UE to retransmit the information on which of methods 1 and 2 is preferred by the UE or the information on the presence or absence of the alternative beam (or the presence or absence of the measured value).

As described above, the information on which of methods 1 and 2 is preferred by the UE or the information on the presence or absence of the alternative beam (or the presence or absence of the measured value) may be simply referred to as 'control information'.

Further, information (1) to (4) described above may be omitted when the information on which of methods 1 and 2 is preferred by the UE or the information on the presence or absence of the alternative beam (or the presence or absence of the measured value) is first reported to the base station.

Next, a method for deciding (or determining) the reference resource for the beam measurement and the beam reporting will be described.

The UE explicitly or implicitly reports to the base station (i) information indicating there is the measurement value for the alternative beam (or method 2 is preferred) in the beam recovery request signal (or beam failure reporting signal).

Thereafter, when the UE receives an aperiodic beam reporting triggering instruction from the base station (within a specific time or before a specific timer expires), the UE may determine as the reference resource a resource (e.g., periodic RS, activated semi-persistent RS, or pre-triggered aperiodic RS) which may be activated (or triggered or configured) and measured before a slot in which the reporting triggering message is received among resources (RSs) included in the resource setting (setting method 1)/the resource set (setting method 2) associated with the aperiodic beam reporting and perform the beam measurement and the beam reporting.

That is, the reference resource is determined as a specific resource activated before the slot in which the reporting triggering message is received.

Contents thereof will be described with reference to FIG. 10*b* for describing method 2.

As another example, the UE explicitly or implicitly reports to the base station (ii) information indicating that there is no measurement value for the alternative beam (or method 1 is preferred) in the beam recovery request signal (or beam failure reporting signal).

Thereafter, when the UE receives an aperiodic beam reporting triggering instruction from the base station (within a specific time or before a specific timer expires), the UE may determine as the reference resource a resource (e.g., triggered/activated aperiodic RS in later slot(s)) to be activated (or triggered or configured) in a slot which is the same as the slot in which the reporting triggering message is received or at a time after the slot among resources (RSs) included in the resource setting (setting method 1)/the resource set (setting method 2) associated with the aperiodic beam reporting and perform the beam measurement and the beam reporting. Contents thereof will be described with reference to FIG. 10*a* for describing method 1.

That is, the reference resource is determined as a specific resource to be activated in the same which is the same as the slot in which the reporting triggering message is received or a slot after the slot in which the reporting triggering message is received.

Figure 12:
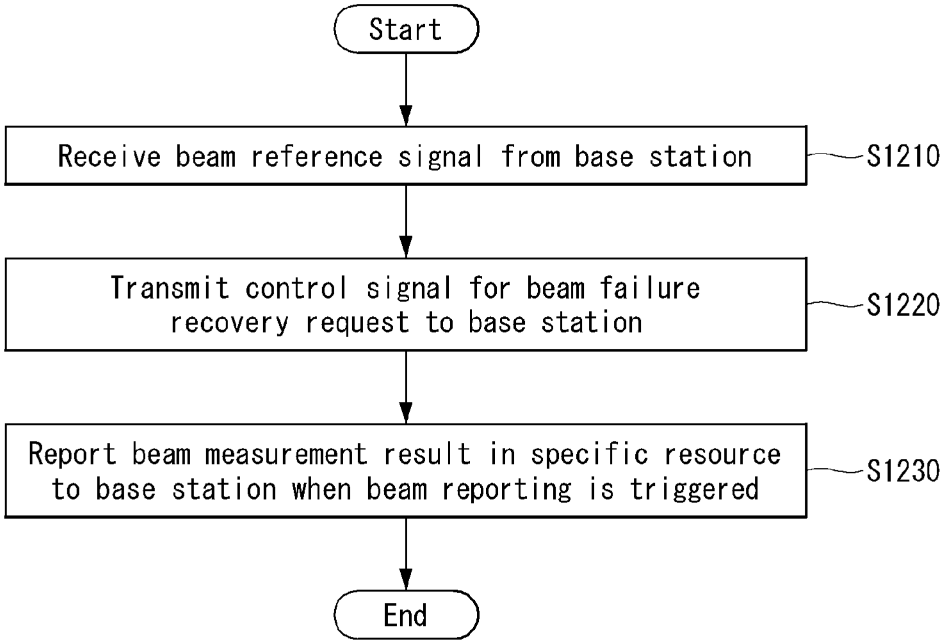
FIG. 12 is a flowchart illustrating an example of a method for performing a beam recovery.

FIG. 12 is a flowchart illustrating an example of a method for performing a beam recovery.

First, the UE receives a beam reference signal (BRS) used for beam management from the base station (S1210).

Thereafter, when a beam failure event is detected, the UE transmits a control signal for a beam failure recovery request to the base station (step S1220).

The beam failure event may be detected based on the received beam reference signal.

The control signal includes indication information indicating whether an alternative beam exists.

As described above, the alternative beam may refer to a reference signal having a channel quality higher than a specific channel quality among the reference signals configured for the beam management.

Thereafter, when beam reporting is triggered, the UE reports a beam measurement result to the base station in a specific resource (S1230).

The control signal may use the same time resource as a Physical Random Access Channel (PRACH).

In this case, the control signal may be Code Division Multiplexed (CDM) or Frequency Division Multiplexed (FDM) in the PRACH and the time resource.

The control signal may be transmitted through a Physical Uplink Control Channel (PUCCH).

The control signal may use different time and/or frequency resources, different sequence sets, and/or different Uplink Control Information (UCI) depending on the absence or absence of the alternative beam.

In this case, the different sequence sets may be distinguished by a root sequence index or a cyclic shift value.

Further, the indication information may be information on a preferred link associated with a predetermined non-periodic beam reporting setting, information on a preferred resource setting associated with the predetermined aperiodic beam reporting setting, or information on a preferred resource set associated with the predetermined aperiodic beam reporting setting.

Additionally, the UE may receive an indication message indicating triggering of the beam reporting from the base station.

Here, the beam reporting may be triggered based on the indication message.

The indication message may include at least one of information associated with a valid or invalid link in settings pre-associated with a measurement setting, information associated with a valid or invalid resource setting in the settings pre-associated with the measurement setting, information associated with a valid or invalid resource set in the settings pre-associated with the measurement setting, or beam reporting mode setting information.

In the measurement setting, one reporting setting and each of two resource settings may be connected by a link or one reporting setting and one resource setting may be connected by the link.

The beam reporting mode setting information may indicate a first mode in which transmission of an aperiodic beam reference signal and aperiodic beam reporting are triggered together or a second mode in which only the aperiodic beam reporting is triggered.

The first mode represents the joint triggering mode described above and the second mode represents the reporting triggering only mode described above.

When the beam reporting mode setting information is set to the first mode, the specific resource may be the aperiodic resource setting or the aperiodic resource set in the resource setting or the resource configured by radio resource control (RRC).

In this case, the specific resource may be a resource activated so that beam measurement is enabled in a slot which is the same as a slot in which the indication message is received or after the slot in which the indication message is received.

Alternatively, when the beam reporting mode setting information is set to the second mode, the specific resource may be a periodic resource setting or semi-persistent resource setting or resource set configured by the RRC the aperiodic resource set in the resource setting or the resource set by radio resource control (RRC).

In this case, the specific resource may be a resource activated to enable the beam measurement before the slot in which the instruction message is received.

Additionally, the UE may receive a response to the report from the base station.

When the response is NACK, the UE may retransmit information including at least one of the indication information or information included in the indication message to the base station.

Hereinafter, a method for performing all or some of beam reporting information simultaneously together with beam failure reporting differentially according to a type of UL resource and/or a configuration of the UL resource performing a beam recovery request will be described.

The beam recovery request may be expressed as the beam failure reporting.

The beam reporting information may be, for example, a preferred DL Tx beam indicator(s), a beam quality metric(s) (e.g., L1 RSRP, CQI), etc.

The preferred DL Tx beam indicator(s) may be, for example, a beam ID, a CSI-RS Resource Indicator (CRI), an RS port index, a synchronization signal block (SSB) index, a PBCH DMRS index, etc.

The beam quality metric(s) may be, for example, L1 RSRP, CQI, etc.

When all of the beam reporting information is reported, the aperiodic beam reporting triggering process of the base station and the subsequent beam reporting process of the UE may be omitted in setting method 2 (Method 2) described above and this may be defined as 'setting method 3'.

In addition, the method for reporting some of the beam reporting information includes a method for reporting only some information and a method for transmitting coarse information (or information of lower granularity).

For example, the L1 RSRP that is transmitted with the beam failure reporting may be configured to include (or allocate) fewer bits than L1 RSRP transmitted through the subsequent beam reporting process and have a lower quantization level.

Alternatively, the base station may cause the UE to calculate and report a difference value from a reporting value when (the beam failure) is reported at a previous time (beam failure) and reduce the amount of (beam failure) reporting information.

For example, the UE may transmit a differential CQI and differential RSRP together with the beam failure reporting.

As described above, as a resource for transmitting the beam recovery request (BRR) in the NR system, a UL resource (hereinafter, referred to as 'UL type I') which is Code Division Multiplexed (CDM) or Frequency Division Multiplexed (FDM) with the PRACH to share the time resource with the PRACH and a UL resource (hereinafter, referred to as 'UL type II') which uses a different time resource from the PRACH may be both used.

The UL type I may be configured in a slot type/configuration (e.g., UL slot, UL dominant slot) having a relatively large number of UL resources similarly to the PRACH and the UL type II may be configured in a slot having a small number of UL resources like the PUCCH.

The UL type I may be separately configured PRACH preambles for the purpose of the beam recovery request (or beam failure reporting request).

That is, the PRACH may be used for the beam recovery request and the PRACH may be a contention-free (or non-contention) based PRACH or a contention based PRACH.

Here, the contention-free based PRACH resource(s) may be FDM or CDM with other contention-free based PRACH resource(s) (using the same time or frequency resource but different sequence).

For example, the UL type I may be PRACH preambles configured for the purpose of a beam failure reporting request (BFRQ) and the UL type II may be short/long PUCCH resources.

Then, the UE may report the beam quality (L1-RSRP) only when transmitting the BFRQ using the UL type II.

In the NR system, the PUCCH is divided into two types (short PUCCH or long PUCCH).

The short PUCCH may consist of one or two symbols, and may be located at the end of the slot, and may transmit uplink control information (UCI) of up to several tens of bits.

In addition, the long PUCCH may consist of 4 to 12 symbols (or 14 symbols) and may transmit UCI of up to several hundreds of bits.

The UL type II may be transmitted through a PUSCH, a short/long PUCCH, or a separately defined uplink channel.

However, considering a link adaptation problem, a UL resource allocation problem, etc. in the beam failure situation, it is preferable that the UL type II is transmitted using the short PUCCH and/or the long PUCCH.

The expression of 'A and/or B' used in the present disclosure may be construed as the same meaning as 'including at least one of A or B'.

Since the UL type I uses the same time resource as the PRACH, the base station may assume to apply Rx beam sweeping (in all directions) in order to receive the corresponding signal (beam recovery request signal).

Therefore, it is advantageous that the beam restoration request signal is designed so as to have a structure in which a small amount of information is repeatedly transmitted, because a signal is received with good quality only in a time/frequency resource corresponding to a specific beam.

Therefore, it may be preferable that the UL type I is configured not to include the additional beam reporting information (the preferred DL transmission beam indicator, beam quality metric) or to include only the beam reporting information that is configured in a smaller number of bits than the UL type II.

In addition, in the case of the UL type I, setting method 3 (of method 2) is not supported.

Even in the case of the UL type II, a mechanism supported according to a PUCCH type (short PUCCH or long PUCCH) and a PUCCH resource size (the number of symbols and/or PRB size) may be defined or configured differentially.

For example, in the beam information that may be transmitted through the long PUCCH, the corresponding L1 RSRP as well as the RS indicator for beam identification may be transmitted, but in the beam information which may be transmitted through the short PUCCH, the L1 RSRP may be omitted.

Alternatively, the short PUCCH may be designed or defined such that the additional beam reporting information is not included.

In addition, the supported beam report information may be designed differentially according to (a range of) the number of short/long PUCCH symbols.

Further, the short PUCCH may be undesirable to be semi-statically allocated (or configured) by the RRC because the short PUCCH is primarily designed for the purpose of fast ACK/NACK.

Therefore, it may more preferable that the UL type II is transmitted only in the long PUCCH.

In the foregoing description, it is assumed that the UL type I and the UL type II are differentially (or respectively) designed or defined, but may also be integrally designed.

Hereinafter, a method for integrally designing the UL type I and the UL type II will be described.

The base station may configure separate (multiple) UL resources by the RRC according to characteristics and an amount of information which may be transmitted together with the beam failure reporting.

In this case, a specific UL resource configured to a period 'N' (where N is a natural number) may be CDMed or FDMed with the PRACH resource at a period of N times an integer multiple and may be TDMed with the PRACH resource at the remaining points of time.

Here, an information configuration transmitted in the corresponding resource may be configured identically regardless of a reporting point of time.

Method for Transmitting Information on Presence or Absence of Alternative Beam

Feedback information of an implicit/explicit indication of the presence or absence of the alternative beam may also be included in the beam reporting information differentially according to the type and/or configuration of the UL resource or may be transmitted together with the beam recovery request.

For example, in the case of the UL type I, since the base station will receive a signal in all directions and may support only a small feedback payload, the base station may receive reporting for the presence or absence of the alternative beam together with the beam recovery request from the UE (supporting setting method 1 and/or setting method 2).

In addition, in case of the UL type II, since the base station will receive the signal in a specific direction, the alternative beam presence/absence information is defined to be used only when there is the alternative beam, so that the alternative beam presence/absence information are not transmitted together with the beam recovery request and the base station may allow the UE to report the alternative beam presence/absence information including information (and beam quality information) for beam identification (supporting setting method 2 and/or setting method 3).

The beam identification information may be delivered in an implicit manner.

In this case, the base station may implicitly acquire DL beam information for the corresponding UE according to UL resource information in which the UE transmits the signal when a UL resource corresponding to a DL resource is configured (for a UE in which channel reciprocity is established (or beam correspondence is established)) (for example, in a manner in which a UE having an excellent quality of a DL RS resource x transmits the signal by using a UL resource y).

That is, in a situation where a plurality of UL resources (e.g., UL type I or UL type II) corresponding to each of a plurality of DL resources (e.g., synchronization signal block, PBCH DMRS resource, and CSI-RS resource) are mapped and configured, the UE transmits the signal by selecting one or multiple UL resources, and as a result, the base station may implicitly identify whether a DL Tx beam corresponding to a predetermined DL resource has the excellent quality (as the alternative beam).

Figure 13:
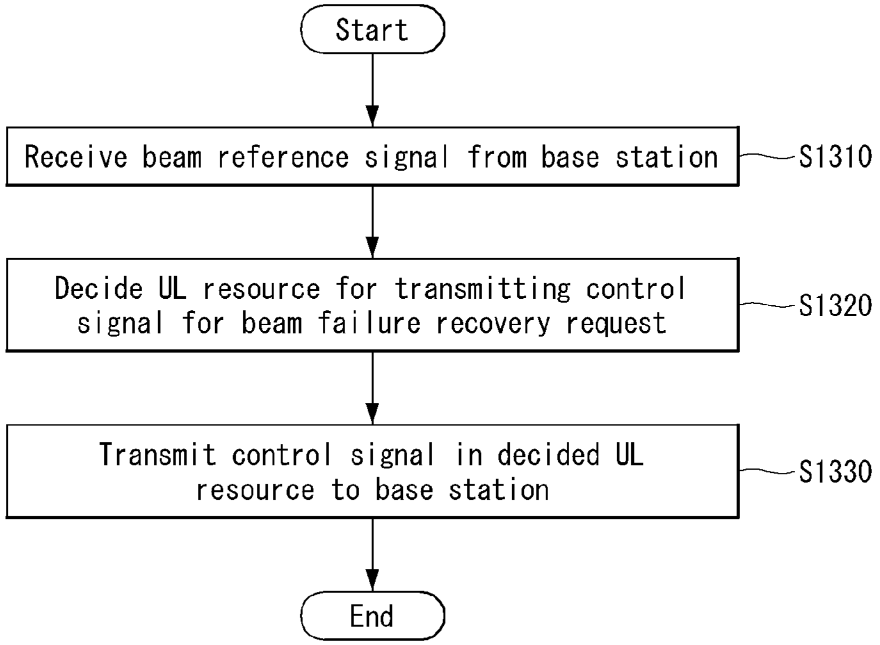
FIG. 13 is a flowchart illustrating an example of an operation of a UE performing a beam recovery.
Figure 14:
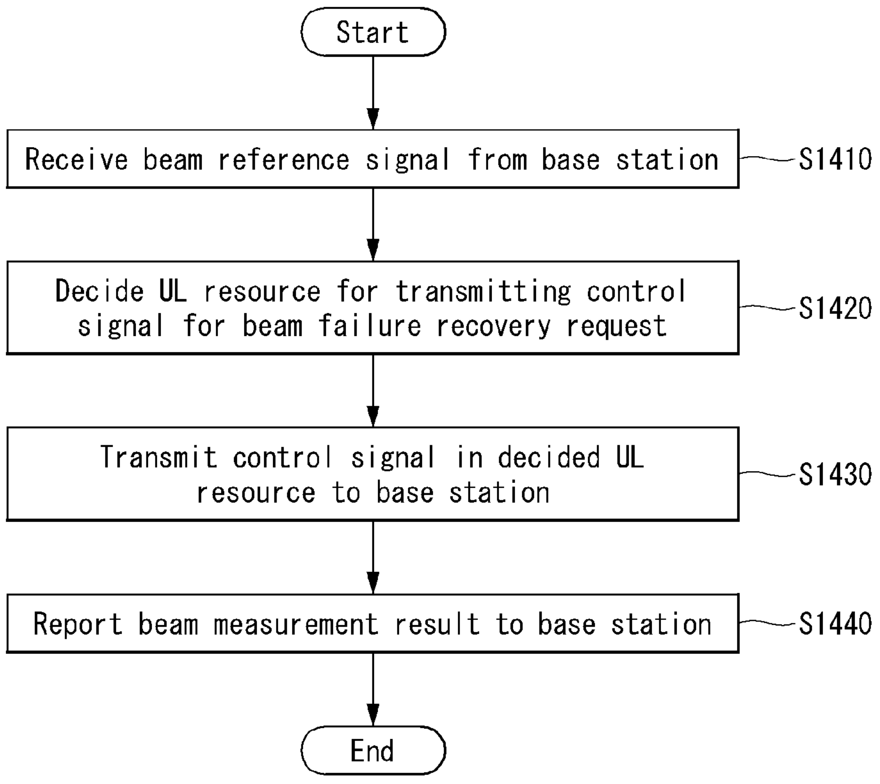
FIG. 14 is a flowchart illustrating another example of an operation of a UE performing a beam recovery.

FIGS. 13 and 14 are flowcharts illustrating an example of an operation of a UE performing a beam recovery.

A part of FIG. 14 which is the same as that of FIG. 13 will be described with reference to FIG. 13 and only differences will be shown and described separately.

First, the UE receives the beam reference signal (BRS) used for beam management from the base station (S1310).

Thereafter, when the beam failure event is detected, the UE decides an uplink (UL) resource for transmitting the control signal associated with the beam failure recovery request (step S1320).

Here, the UL resource may be a Type 1 resource using the same time resource as the Physical Random Access Channel (PRACH) or a Type 2 resource using a different time resource from the PRACH.

Further, the Type 1 resource may be Frequency Division Multiplexed (FDM) and/or Code Division Multiplexed (CDM) with the PRACH.

In addition, the Type 2 resource may be a physical uplink control channel (PUCCH) resource or a physical uplink shared channel (PUSCH) resource.

When the Type 2 resource is the PUCCH resource, the PUCCH resource may be at least one of the short PUCCH or the long PUCCH.

Thereafter, the UE transmits the control signal to the base station in the decided UL resource (S1330).

Here, the control signal may include some or all of the information associated with the beam reporting or may not include information associated with the beam reporting.

When the UL resource is type 1 resource, the control signal may include only some of the information associated with the beam reporting and the information associated with the beam reporting may include the information on the presence or absence of the alternative beam.

The alternative beam may refer to a reference signal having a channel quality higher than a specific channel quality among the reference signals configured for the beam management.

When the UL resource is the Type 2 resource, the control signal may include all of the information associated with the beam reporting.

In this case, the information associated with the beam reporting may include at least one of beam identification information for beam identification or beam quality information indicating a beam quality.

Additionally, when the control signal includes some of the information associated with the beam reporting, the UE reports a beam measurement result to the base station in a specific resource (S1440). Here, the reporting of the beam measurement result may be performed when the beam reporting is triggered.

Steps S1410 to S1430 in FIG. 14 are the same as steps S1310 to S1330 in FIG. 13.

Figure 15:
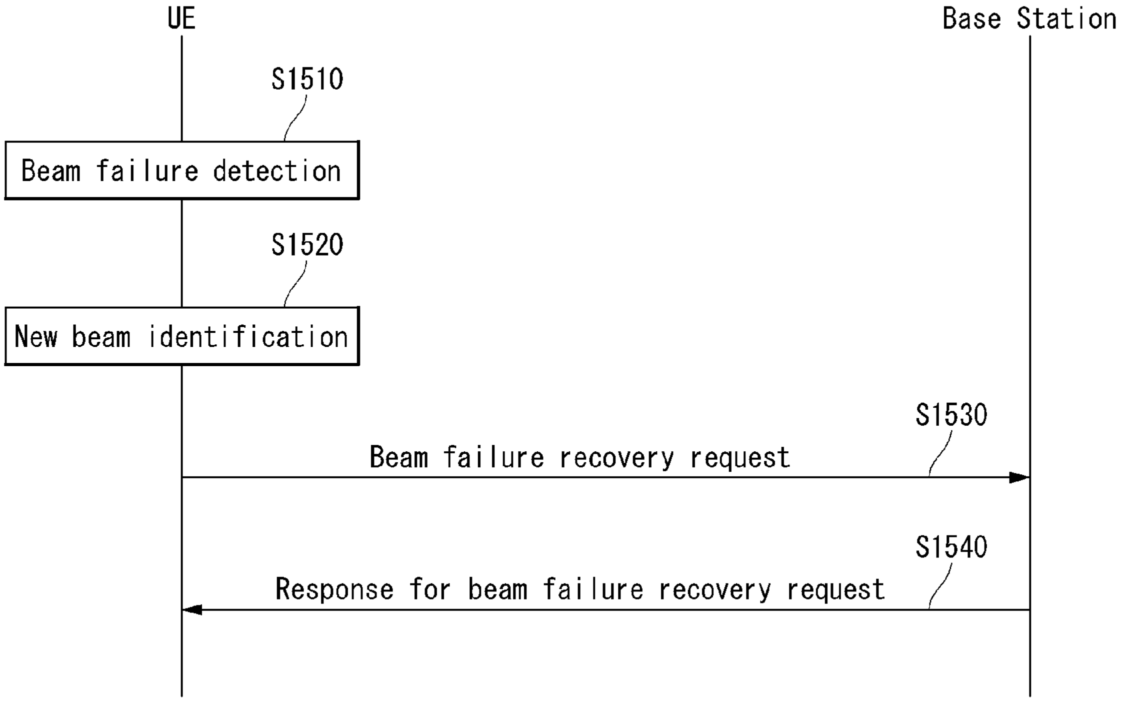
FIG. 15 is a flowchart illustrating an example of a beam failure recovery procedure.

FIG. 15 is a flowchart illustrating an example of a beam failure recovery procedure.

The BFR procedure may include (1) a beam failure detection step S1510, (2) a new beam identification step S1520, (3) a beam failure recovery request (BFRQ) step S1530, and (4) a step S1540 of monitoring a response for the BFRQ from a base station.

PRACH preambles or PUCCH may be used for the step S1530, i.e., the BFRQ transmission.

The step S1510, i.e., the beam failure detection is described in more detail.

When block error rates (BLERs) of all serving beams are equal to or greater than a threshold, it is called a beam failure instance.

RSs (qo) to be monitored by the UE is explicitly configured by RRC or is implicitly determined by a beam RS for a control channel.

An indication of the beam failure instance on higher layer is periodic, and an indication interval is determined by a lowest period of beam failure detection (BFD) RSs If an evaluation is lower than a beam failure instance BLER threshold, an indication on the higher layer is not performed.

When N consecutive beam failure instances occur, a Beam failure is declared.

Here, N is NrofBeamFailureInstance parameter configured by the RRC.

1-port CSI-RS and an SSB are supported for a BFD RS set.

Next, the step S1520, i.e., the new beam indication is described.

A network (NW) may configure one or multiple PRACH resource(s)/sequence(s) to the UE.

The PRACH sequence is mapped to at least one new candidate beam.

The UE selects a new beam among candidate beams in which L1-RSRP is equal to or greater than a threshold configured with the RRC, and transmits the PRACH through the selected beam. In this instance, which beam the UE selects may be a UE implementation issue.

Next, the steps S1530 and S1540, i.e., the BFRQ transmission and the monitoring of a response for the BFRQ are described.

Dedicated CORESET may be configured by the RRC in order for the UE to monitor a time duration of a window and a response of the base station to the BFRQ.

The UE starts to monitor after 4 slots of the PRACH transmission.

The UE assumes that the dedicated CORESET is spatially QCLed with a DL RS of the UE-identified candidate beam in the beam failure recovery request.

If a timer is expired or the number of PRACH transmissions reaches a maximum number, the UE stops a BFR procedure.

The maximum number of PRACH transmissions and the timer are configured with the RRC.

An SS block (SSB) indication and a beam failure recovery are described below.

At least for rate matching purpose for the serving cell, for below 6 GHz, full bitmap (8 bits) is used for an indication of actual SS/PBCH block transmission.

UE-specific RRC signaling with full bitmap may be used to indicate the actually transmitted SS blocks for both a sub-6 GHz case and an over-6 GHz case.

The actually transmitted SS blocks are indicated in remaining minimum system information (RMSI) for both the sub-6 GHz case and the over-6 GHz case.

The indication is in a compressed form in above 6 GHz case, and an indication method is selected among following alternatives.

(Alternative 1): Group-Bitmap and bitmap in group

A group is defined as consecutive SS/PBCH blocks.

Bitmap in the group may indicate which SS/PBCH block is actually transmitted within the Group, each group has the same transmission pattern of SS/PBCH block, and group-bitmap may indicate which group is actually transmitted.

For example, [8]+[8] bits in case of eight groups and eight SS/PBCH blocks per group.

(Alternative 2): Group-Bitmap and the number of actually transmitted SS/PBCH blocks in group (fixed starting index of SS/PBCH block)

A group is defined as consecutive SS/PBCH blocks.

Group-bitmap indicates which group is actually transmitted, SS/PBCH blocks within a group are logically consecutive, the number of actually transmitted SS/PBCH blocks indicates how many logically consecutive SS/PBCH blocks are actually transmitted starting from the first index, and the corresponding number is commonly applied to all transmitted groups.

For example, [8]+[3] bits in case of eight groups and eight SS/PBCH blocks per group.

(Alternative 3): Bitmap in group and the number of actually transmitted groups (with fixed starting index of group)

A group is defined as consecutive SS/PBCH blocks.

Bitmap in group may indicate which SS/PBCH block is actually transmitted within a corresponding group, each group has the same pattern of SS/PBCH block transmission, and the number of actually transmitted groups indicates how many consecutive groups are actually transmitted starting from the first group.

For example, [8]+[3] bits in case of eight groups and eight SS/PBCH blocks per group.

(Alternative 4): Group-Bitmap and the number of actually transmitted SS/PBCH block in each group A group is defined as consecutive SS/PBCH blocks.

Group-bitmap may indicate which group is actually transmitted, SS/PBCH blocks within a group are logically consecutive, and the number of actually transmitted SS/PBCH blocks for each group indicates how many logically consecutive SS/PBCH blocks are actually transmitted starting from the first index.

Minimum [8]+[3] bits and maximum [8]+[3]*[8] bits in case of eight groups and eight SS/PBCH blocks per group.

(Alternative 5): The number of actually transmitted SS/PBCH blocks, a starting index, and a gap between two consecutive SS/PBCH blocks are [6]+[6]+[6] bits.

(Alternative 6): Group-Bitmap

A group is defined as consecutive SS/PBCH blocks.

Group-bitmap may indicate which group is actually transmitted, and all SS/PBCH blocks within a transmitted group are actually transmitted.

For example, [8] bits in case of eight groups and eight SS/PBCH blocks per group.

Indicated resources are reserved for actually transmitted SS blocks.

Data channels are rate-matched around the actually transmitted SS blocks.

Next, contents related to a beam failure recovery are described

A beam failure is declared only when all serving control channels fail.

In addition to periodic CSI-RS, the SS-block within the serving cell may be used for new candidate beam identification.

The following options may be configured for the new candidate beam identification.

CSI-RS resources only

In this case, SSB is not configured for the new candidate beam identification.

SS block resources only

In this case, CSI-RS is not configured for the new candidate beam identification.

Both SS block resources and CSI-RS resources

For beam failure recovery request transmission on a contention-free physical random access channel (PRACH), the use of separate PRACH resources that is CDMed (code division multiplexing) or FDMed (frequency division multiplexing) with other PRACH resources is supported. That is, the base station may configure separate contention-free PRACH resources for the BFR purpose, and the base station may implicitly grasp that the corresponding UE is in a beam failure state if the UE transmits the corresponding PRACH resources and the base station receives the PRACH resources.

Here, the CDM means the same sequence design as PRACH preambles.

The PRACH preambles for beam failure recovery request transmission are chosen from preambles for a content-free PRACH operation in Rel-15.

Next, usage and configuration of SS blocks for beam failure recovery are described.

'reference signal (RS)' used below may mean a radio signal such as a synchronization signal (SS), an SS block, and a physical channel.

'configuration' used in the present disclosure may be interpreted as the same meaning as 'indication' or 'designation'.

The SS block used in the present disclosure may be interpreted as the same meaning as the SS/PBCH block and the SSB.

In order to identify a new candidate beam, the SS block as well as CSI-RS may be used.

From DL RS configuration perspective, DL RSs among which the UE searches to find a new candidate beam, i.e., a beam with better quality than a current serving DL RS may be explicitly configured by the network.

Another necessary DL RS configuration is to indicate which UL resource can be used when which DL RS quality is good especially for UEs having a beam correspondence. Alternatively, even a non-beam correspondence UE in which a correspondence between a transmission beam and a reception beam does not well match, the base station can grasp in advance which reception beam is optimum when the UE has used which uplink beam through the above-described uplink beam management process.

Thus, if the base station and the UE promise to transmit the PRACH using which uplink beam when a specific downlink beam is good or bad, the base station has no problem of grasping the reception for the corresponding PRACH and whether which downlink beam of the corresponding UE is good or bad upon the reception of the corresponding PRACH.

For the case of beam failure, the UE may be configured with multiple beam failure recovery request resources (BFRs).

Here, the BFR refers to the UL resource that is FDMed, CDMed, or TDMed with the PRACH to be used for the beam failure recovery request.

For a UE having the beam correspondence, each BFR may be associated with DL beam(s) similarly to the PRACH.

This reason is that the PRACH resource may be associated with the SS block or the CSI-RS.

Alternatively, as described above, for the non-beam correspondence UE, each BFR may be associated with DL beam(s).

It is quite natural to support RRC configuration of the association of each BFR with either the SS block or the CSI-RS.

After all, the following two DL RS configurations may be necessary for beam recovery.

DL RS set configuration 1. If a serving beam fails, a new candidate DL RS beam list that the UE will find DL RS set configuration 2. When a specific candidate DL RS beam is good, a list to use which BFR (DL RS resource information associated to each BFR)

Before describing beam failure recovery methods proposed in the present disclosure, contents related to the beam failure recovery are briefly summarized.

The expression "CSI-RS+SSB for new beam identification" described in the present disclosure may mean that both CSI-RS and SSB are used for new beam identification.

(1) An RRC parameter for configuring RS resources is supported for new candidate beam identification.

The beam failure detection is determined based on a quality measure of hypothetical PDCCH BLER.

(2) Beam-failure-recovery-request-RACH-Resource parameter is supported.

Parameters for dedicated PRACH resources for beam failure recovery are as follows.

- Preamble sequence related parameters, for example, a root sequence, a cyclic shift, and a preamble index.
- Maximum number of transmissions
- Maximum number of power rampings
- Target received power
- Timer for retransmission
- Retransmission Tx power ramping step size
- Beam failure recovery timer If the number of consecutively detected beam failure instances exceeds a configured maximum number, a beam recovery request is transmitted.

If the hypothetical PDCCH BLER is a threshold or more, it is counted as the beam failure instance.

For reference, the beam failure is determined when all the serving beams fail.

If metric X of a candidate beam is higher than a threshold, the candidate beam is identified.

One or two thresholds may be used. If two thresholds are used, one is for SSB, and the other is for CSI-RS.

(3) CSI-RS+SS block case is supported for new candidate beam identification.

The above case is configured by gNB.

The dedicated PRACH resource is configured to either an SSB or a CSI-RS resource.

When a UE is configured with CSI-RS+SSB for the new candidate beam identification, the following two scenarios are supported.

Scenario 1: PRACHs are associated to SSBs only.

In the scenario 1, CSI-RS resources for new beam identification can be found from the QCL association to SSB.

Scenario 2: Each of the multiple PRACHs is associated to either an SSB or a CSI-RS resource.

(4) In order for the gNB to uniquely identify a UE ID from a beam failure recovery request transmission of the UE, a PRACH sequence is configured to the UE.

(5) A gNB response is transmitted via a PDCCH addressed to C-RNTI.

A DCI format for the gNB response may be determined later.

Dedicated CORESET is applied for monitoring the gNB response for BFRQ.

The dedicated CORESET is selected among the following two alternatives.

Alt 1: The same CORESET(s) as a previous beam failure.

Alt 2: Dedicatedly configured CORESET for a beam error recovery.

(6) The UE supports RRC configuration of a time duration for a time window and dedicated CORESET in order to monitor the gNB response for a beam failure recovery request.

The UE assumes that the dedicated CORESET is spatially QCLed with DL RS of a UE-identified candidate beam in the beam failure recovery request.

Each step of a beam failure recovery procedure described in the present disclosure is described in more detail below.

First, a process for new beam identification is described.

For metric X, even though a failure of a serving beam is determined by a hypothetical block error rate (BLER), the use of L1-reference signal received power (RSRP) may be more beneficial than the hypothetical BLER (for new beam identification).

Here, the metric X, as described above, is a value compared to a threshold for candidate beam identification.

First of all, when the UE is requested to report the quality of new candidate beams, the L1-RSRP may be aligned with a corresponding beam reporting parameter.

Secondly, since a BLER threshold can be set by the network in a pessimistic way, it may not seem a critical problem to use different metric for the new beam identification. A beam failure recovery corresponds to a tool for decreasing a probability of falling into a link failure. If the UE cannot find (or detect) any new candidate beam satisfying a L1-RSRP threshold, the UE can perform a link recovery. Lastly, a computation burden for BLER may be much higher than that for L1-RSRP at the UE side. If the UE have to compute tens or hundreds of BLERs, this may has a very critical influence from UE implementation perspective.

Accordingly, the following five proposals for new beam identification are defined based on the above matters.

(Proposal 1)

The proposal 1 is to use L1-RSRP as metric (e.g., metric X) for new candidate beam identification.

For configuration of a threshold for the metric X, configurability of the gNB is requested for the network to set different threshold(s) depending on cell deployment environments similarly to PRACH.

(Proposal 2)

The proposal 2 is to support gNB configurability of thresholds for new beam identification (i.e., metric X). Two thresholds are supported for the case of CSI-RS+SSB for new beam identification.

The following scenarios 1 and 2 are an example of the CSI-RS+SSB case for new beam identification.

Scenario 1: PRACHs are associated to SSBs only. In the scenario 1, CSI-RS resources for new beam identification can be found from the QCL association to SSB(s).

Scenario 2: Each of the multiple PRACHs is associated to either an SSB or a CSI-RS resource.

Comparing the two scenarios, the scenario 2 is simpler in terms of gNB/UE operation, but the scenario 1 can greatly save a required amount of PRACH resources.

Figure 16:
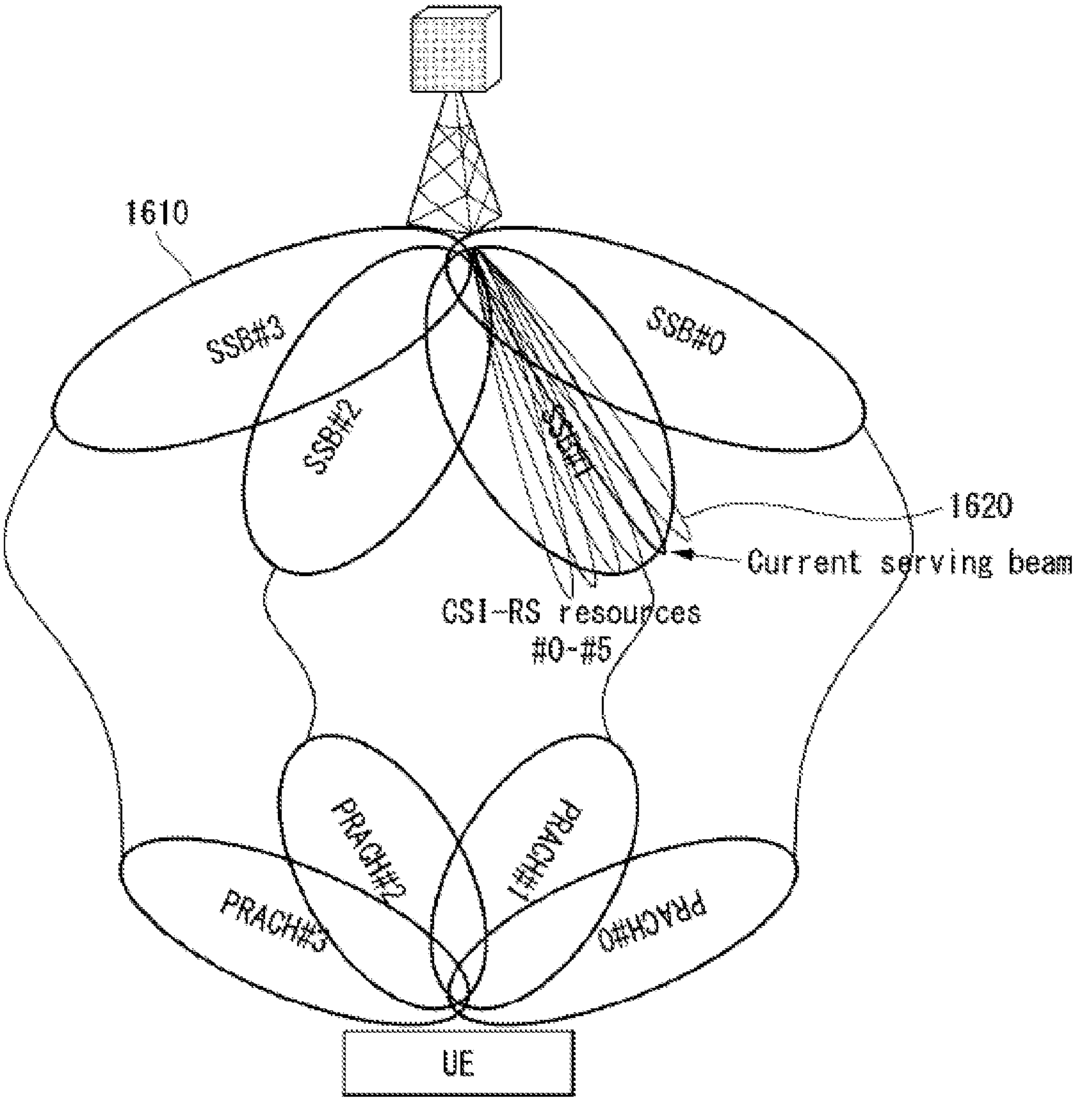
FIG. 16 illustrates an example of spatial coverage of CSI-RS and SS block that are applicable to a method described in the present disclosure.

FIG. 16 illustrates an example of spatial coverage of CSI-RS and SS block that are applicable to a method described in the present disclosure.

As illustrated in FIG. 16, when a spatial coverage (or beam-width) 1620 of a CSI-RS resource is narrower than a spatial coverage of a SSB, a saving effect of the PRACH resources becomes larger especially.

In FIG. 16, it may seem that six CSI-RS resources are QCLed with SSB #1. It is assumed that one of the CSI-RS resources serves as a serving beam (i.e., spatially QCLed with the PDCCH).

In this case, only four PRACH resources are required to be configured if the scenario 1 is applied (i.e., one PRACH for one SSB), while ten PRACH resources are required to be configured for the scenario 2. In FIG. 16, the gNB uses a wide beam (i.e., beam width of SSB) to receive the PRACH, while the gNB uses a narrow beam (i.e., beam width of CSI-RS) for downlink transmission for the UE.

If the UE finds the CSI-RS resource as a new candidate beam, the UE can use the PRACH resource associated with the SSB which is spatially QCLed with the found CSI-RS resource(s) to send a beam failure recovery request (BFRQ). The UE can send more information about a new beam (e.g., CRI) to the gNB using the PUSCH assigned through a gNB's response for the BFRQ.

(Proposal 3)

In the proposal 3, for scenario 1 of CSI-RS+SSB for new beam identification,

- if the found new beam is CSI-RS, the UE sends a BFRQ through the PRACH associated with the SSB which is spatially QCLed with the CSI-RS satisfying threshold conditions described above.
- if the found new beam is SSB, the UE sends the BFRQ through the PRACH associated with the SSB, which satisfies threshold conditions described above.

For the scenario 1, the gNB may have ambiguity whether the UE has found anew beam from the SSB associated with the PRACH from which the BFRQ is received, or has found a new beam from the CSI-RS resources QCLed with the corresponding SSB. This ambiguity can be resolved by requesting more information about the new beam to the UE on PUSCH/PUCCH assigned or triggered after receiving the BFRQ.

To remove this ambiguity from the beginning, the gNB may configure up to two PRACH resources associated to one SSB. If a new beam is found from QCLed CSI-RS resources, the UE may send the BFRQ through a first PRACH resource. If the new beam is the SSB itself, the UE may send the BFRQ through a second PRACH resource. In this way, the gNB may distinguish the situation of the UE. If the gNB receives the BFRQ through the first PRACH resource, the gNB may directly assign the PUSCH to receive the CRI and corresponding L1-RSRP (i.e., triggering periodic beam reporting only). In this case, the gNB does not need to transmit the CSI-RS resources to refine the beam to the UE. If the gNB receives the BFRQ through the second PRACH, the gNB needs to trigger the CSI-RS resources as well as PUSCH. If the above method is applied to the example of FIG. 16 (i.e., 4 to 5 PRACH resources), only one PRACH resource needs to be configured to the UE. This is still half of the required PRACH resources for scenario 2.

(Proposal 4)

The proposal 4 is to support up to two PRACH resources associated with one SSB for scenario 1 of CSI-RS+SSB. Here, one PRACH resource is used when the UE finds the associated SSB as a new beam, and another resource is used when the UE finds the new beam from the CSI-RS resources spatially QCLed with the associated SSB.

If both the SSB and the CSI-RS are used for new beam identification, when both the SSB and the CSI-RS satisfy a predetermined condition (e.g., with the quality of a specific threshold or more), (1) the UE may preferentially select the CSI-RS and perform the beam reporting as a new beam (RS).

Alternatively, (2) the UE may preferentially select any of the SSB and the CSI-RS, and the gNB may configure (via RRC message, MAC message, DCI, etc.) whether to perform the reporting as the new beam (RS).

Alternatively, (3) the UE may preferentially select the SSB and perform the reporting as the new beam (RS).

The above (3), i.e., a reason of preferentially selecting the SSB as the new beam is that the SSB has a wider beam width and coverage than the CSI-RS. Further, the above (2), i.e., the case where the new beam is selected by the configuration of the gNB is because it would be better that the gNB controls an RS type to be preferentially selected (for each UE) depending the situation (such as traffic, interference, etc. per beam). Alternatively, the above (2) is because the gNB can configure/designate whether to preferentially select the beam among the RS type and/or which RS set.

Here, in the RS set, SSB ID(s) and/or CSI-RS resource ID(s) may be (mixed) configured.

In addition, the priority may have two steps of high/low, or three or more steps of high/mid/low. The beam selected according to the priority rule selects BFR resources associated with the corresponding beam as well as a beam ID and the quality reporting and can allow a BFRQ (BFR request) signal to be sent.

For the CSI-RS+SSB cases for new beam identification, the UE can first perform a search through CSI-RS resources, and then search the SSB if the CSI-RS does not satisfy the threshold condition. It is because a beam-width of the CSI-RS is narrower than or equal to a beam-width of the SSB in most scenarios. Hence, if the UE finds a new candidate beam among the CSI-RS resources, it would better to use the CSI-RS resource as a new beam than the SSB. In this regard, the following proposal 5 is described.

(Proposal 5)

The proposal 5 is that the UE selects CSI-RS for CSI-RS+SSB for new beam identification if both CSI-RS and SSB satisfy the threshold condition.

Secondly, how to use PUCCH for a beam failure recovery is described below.

Two cases of how to use PUCCH for sending BFRQ are as follows.

Case 1: when a subset of PDCCH beams fails,

Case 2: when a beam failure is detected (i.e., all PDCCH beams fail)

For the Case 1, assuming that at least one PUCCH is associated to each serving PDCCH beam, the PUCCH resource can be used for a fast beam failure recovery request (BFRQ) since one of UL beam pair links can be still alive. For the Case 1, the UE can send quite a large amount of information with respect to a new beam directly through the PUCCH since the link quality of PUCCH is not expected to be damaged seriously. PUCCH formats 2, 3 and/or 4 may be considered for reporting beam ID and corresponding L1-RSRP.

For the Case 2, it is safer to use the PRACH which is more robust to a timing error and larger coverage potentially. However, for the Case 2, the PUCCH can be used as a complementary channel of PRACH to provide more frequent chance for sending the BFRQ to the UE. In this case, if there is no response from the PUCCH, the UE should use the PRACH as a fallback. In this case, the UE should use a robust PUCCH format since the link quality of PUCCH may be degraded. Thus, in this case, PUCCH formats 0 and/or 1 are fit.

(Proposal 6)

In the proposal 6, if a subset of serving control channels fails, PUCCH is used to notify the network of the occurrence of an event. If all serving control channels fail (i.e., beam failure), PRACH is used as a baseline for requesting a beam failure recovery, and PUCCH can be used as complementary.

Another feature described in the present disclosure is to differently configure/use a PUCCH format according to the Case 1 and the Case 2.

In the Case 1, i.e., if a plurality of PDCCH beams is configured, when beam information (i.e., QCLed RS information in terms of spatial RX parameter) configured on PDCCH (or CORESET or search space) received or monitored by the UE is in plural, part of PDCCH BLER is a specific quality or less (e.g., Q_out). However, if remaining PDCCH BLER is the specific quality or more (e.g., Q_in), when BFR associated to RS which is (in terms of DL-UL) spatially QCLed with the PDCCH which is the specific quality or more is PUCCH, the corresponding PUCCH format uses PUCCH formats 2, 3 and/or 4, etc. capable of performing a general beam/CSI reporting (e.g., supporting UCI reporting of tens of bits or more).

If all PDCCH BLERs are the specific quality or less, the corresponding PUCCH sends less information when using PUCCH configured among BFR, and uses more robust PUCCH format 0 and/or 1 (e.g., encoded with a lower coding rate).

PUCCH resources configured for BFRQ should have a higher priority than PUCCH resources configured for other purposes when the UE needs to send the BFRQ on PUCCH.

(Proposal 7)

The proposal 7 is that a PUCCH for sending a BFRQ should have a higher priority than other PUCCHs.

Next, a gNB response for BFRQ is described.

In order for the UE to monitor a gNB response for BFRQ, C-RNTI and a dedicated CORESET are used. PUSCH resource allocation for aperiodic beam reporting is an essential information that should be included in the gNB response for the BFRQ. Further, an aperiodic CSI-RS triggering message should be included in the gNB response for the BFRQ, and this message may be encoded with aperiodic beam reporting triggering.

The message may be transferred to the UE with a form of UL DCI or MAC layer message on a PDSCH whose scheduling is based on a DL DCI format. If there is no explicit signaling of a spatial reference (e.g., CRI (CSI-RS resource index), SRI), a Tx beam for PUSCH transmission may be set to the same as the one used for PRACH. In other words, the spatial reference for PUSCH is determined by the PDCCH from which the UE receives a response for BFRQ.

(Proposal 8)

The proposal 8 is that when a PRACH is used for sending a BFRQ, message/DCI in a response for the BFRQ should include at least following information.

Aperiodic beam reporting triggering accompanied by PUSCH resource allocation

Aperiodic CSI-RS triggering

The aperiodic CSI-RS may not always be triggered.

(Proposal 9)

The proposal 9 is that by default, a spatial reference for PUSCH assigned in a response for a BFRQ can be determined by a PDCCH from which the UE receives the response for the BFRQ.

The proposal 9 is characterized to use UL related DCI (scheduling PUSCH) for PDCCH receiving from CORESET configured for the purpose of receiving the response for the BFRQ, or use DL DCL of compact format to perform the scheduling of PUSCH with an MAC message, and in this case, a CSI/beam reporting triggering field and a CSI-RS triggering field are included in corresponding DCI or MAC message. In this instance, the two fields may be jointly encoded to configure one filed.

Figure 17:
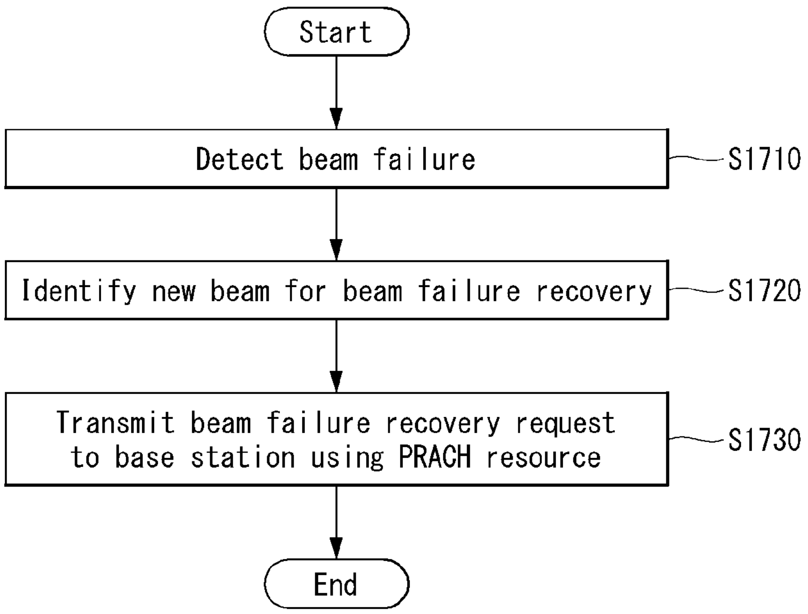
FIG. 17 is a flowchart illustrating an example of an operation method of a UE for a beam failure recovery described in the present disclosure.

FIG. 17 is a flowchart illustrating an example of an operation method of a UE for a beam failure recovery described in the present disclosure.

First, a UE detects a beam failure in S1710.

Next, the UE identifies a new beam for a beam failure recovery in S1720.

Here, the new beam may be at least one reference signal (RS) satisfying a predefined condition.

The RS may be a SS block (SSB) or a channel state information (CSI)-RS resource.

The CSI-RS resource may be spatially quasi-co located (QCL) with the SSB.

The CSI-RS resource may include a plurality of CSI-RS resources.

The predefined condition may be expressed by a specific condition, for example, may be a quality higher than a configured (or predefined) threshold or a quality better than that supporting the CSI-RS/SS block.

The threshold may mean a value used for determining whether a candidate beam (identification related) RS can be used for the beam failure recovery, and may be configured by a base station.

If both the SSB and the CSI-RS resource satisfy the predefined condition, the CSI-RS resource may be identified as a new beam.

Next, the UE transmits a beam failure recovery request to a base station using a PRACH resource in S1730.

The PRACH resource may include a first PRACH resource and a second PRACH resource. The first PRACH resource and the second PRACH resource may be associated with the SSB.

If the SSB is identified as the new beam, the beam failure recovery request may be transmitted using the first PRACH resource. If the CSI-RS resource is identified as the new beam, the beam failure recovery request may be transmitted using the second PRACH resource.

Figure 18:
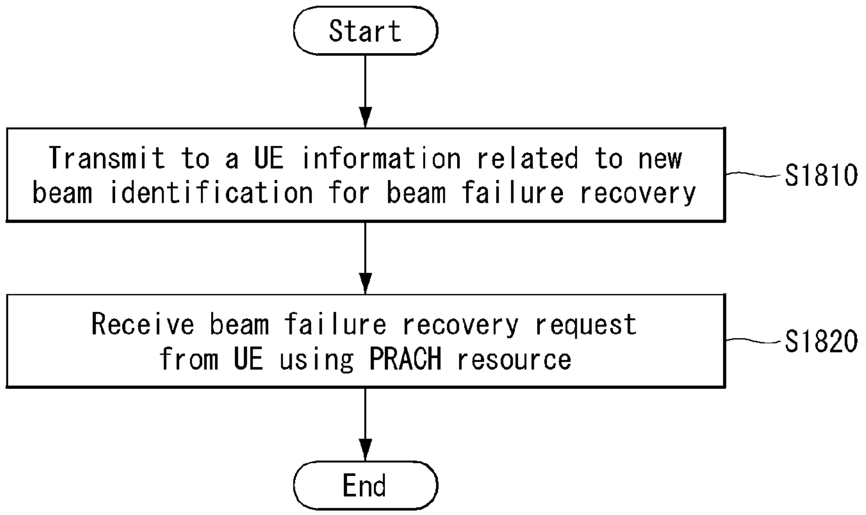
FIG. 18 is a flowchart illustrating an example of an operation method of a base station for a beam failure recovery described in the present disclosure.

FIG. 18 is a flowchart illustrating an example of an operation method of a base station for a beam failure recovery described in the present disclosure.

First, a base station may transmit, to a UE, information related to new beam identification for a beam failure recovery in S1810.

Next, the base station receives a beam failure recovery request from the UE using a PRACH resource in S1820.

The PRACH resource may include a first PRACH resource and a second PRACH resource. The first PRACH resource and the second PRACH resource may be associated with a SS block (SSB).

If a new beam is the SSB, the beam failure recovery request may use the first PRACH resource. If the new beam is a channel state information (CSI)-reference signal (RS) resource, the beam failure recovery request may use the second PRACH resource.

The new beam may be at least one RS satisfying a predefined condition.

The RS may be the SSB or the CSI-RS resource.

The CSI-RS resource may include a plurality of CSI-RS resources.

The CSI-RS resource may be spatially quasi-co located (QCL) with the SSB.

If both the SSB and the CSI-RS resource satisfy the predefined condition, the CSI-RS resource may be identified by the UE as the new beam.

Figure 19:
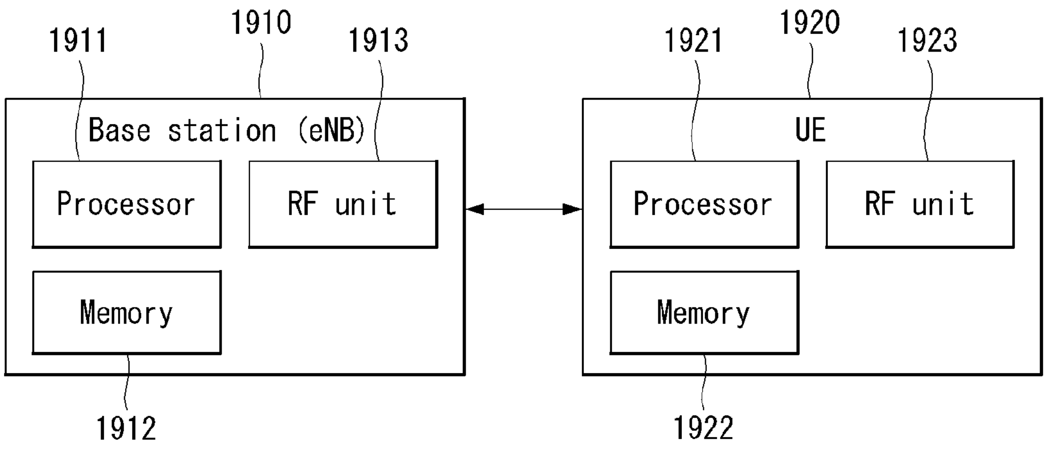
FIG. 19 illustrates a block configuration diagram of a wireless communication device according to an embodiment of the present disclosure.

The description related to FIG. 18 will refer to the description of FIG. 17 with respect to the same contents as FIG. 17, in addition to the description Overview of Device to which the Present Disclosure is Applicable FIG. 19 illustrates a block configuration diagram of a wireless communication device according to an embodiment of the present disclosure.

Referring to FIG. 19, a wireless communication system includes a base station (or network) 1910 and a UE 1920.

The base station 1910 includes a processor 1911, a memory 1912, and a communication module 1913.

The processor 1911 implements functions, processes, and/or methods described in FIGS. 1 to 18. Layers of wired/wireless interface protocol may be implemented by the processor 1911. The memory 1912 is connected to the processor 1911 and stores various types of information for driving the processor 1911. The communication module 1913 is connected to the processor 1911 and transmits and/or receives wired/wireless signals.

The communication module 1913 may include a radio frequency (RF) unit for transmitting/receiving a radio signal.

The UE 1920 includes a processor 1921, a memory 1922, and a communication module (or RF unit) 1923. The processor 1921 implements functions, processes, and/or methods described in FIGS. 1 to 18. Layers of radio interface protocol may be implemented by the processor 1921. The memory 1922 is connected to the processor 1921 and stores various types of information for driving the processor 1921. The communication module 1923 is connected to the processor 1921 and transmits and/or receives radio signals.

The memories 1912 and 1922 may be inside or outside the processors 1911 and 1921 and may be connected to the processors 1911 and 1921 through various well-known means.

Further, the base station 1910 and/or the UE 1920 may have a single antenna or multiple antennas.

Figure 20:
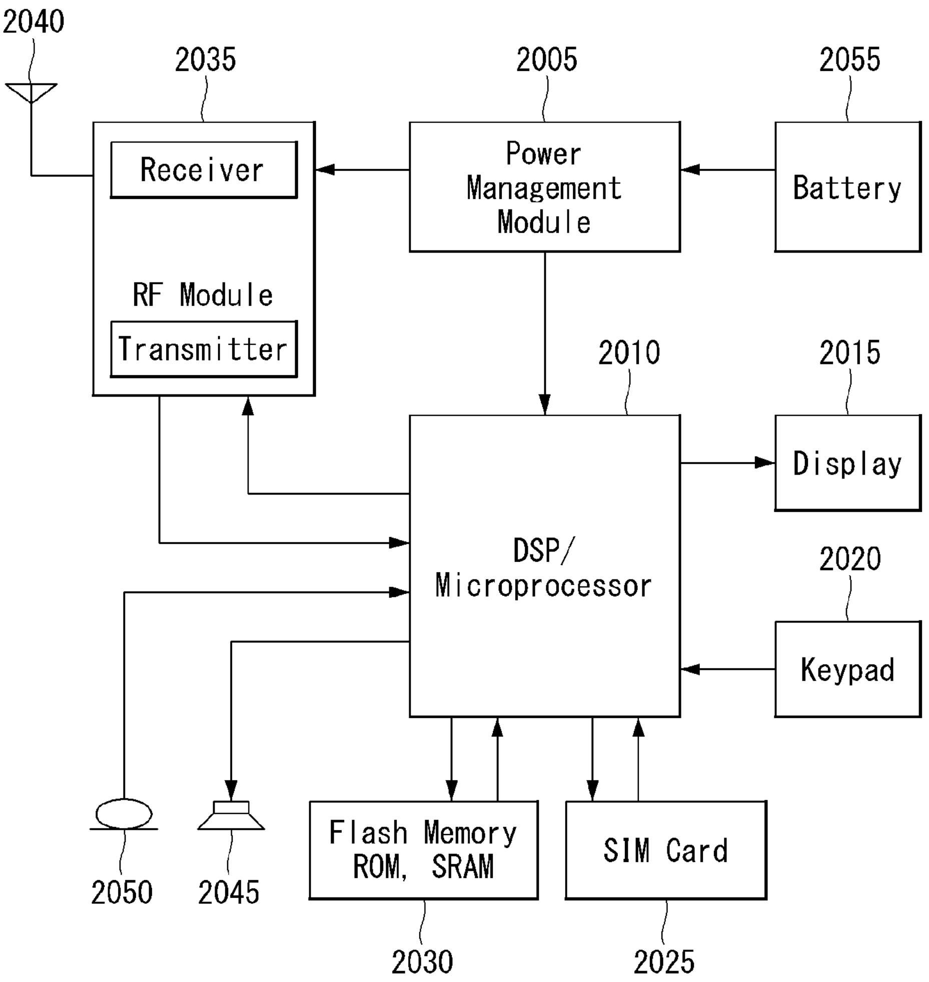
FIG. 20 illustrates a block configuration diagram of a communication device according to an embodiment of the present disclosure.

FIG. 20 illustrates a block configuration diagram of a communication device according to an embodiment of the present disclosure.

In particular, FIG. 20 illustrates in more detail the UE illustrated in FIG. 19.

Referring to FIG. 20, the UE may include a processor (or digital signal processor (DSP)) 2010, an RF module (or RF unit) 2035, a power management module 2005, an antenna 2040, a battery 2055, a display 2015, a keypad 2020, a memory 2030, a subscriber identification module (SIM) card 2025 (which is optional), a speaker 2045, and a microphone 2050. The UE may also include a single antenna or multiple antennas.

The processor 2010 implements functions, processes, and/or methods described in FIGS. 1 to 18. Layers of a radio interface protocol may be implemented by the processor 2010.

The memory 2030 is connected to the processor 2010 and stores information related to operations of the processor 2010. The memory 2030 may be inside or outside the processor 2010 and may be connected to the processors 2010 through various well-known means.

A user inputs instructional information, such as a telephone number, for example, by pushing (or touching) buttons of the keypad 2020 or by voice activation using the microphone 2050. The processor 2010 receives and processes the instructional information to perform an appropriate function, such as to dial the telephone number. Operational data may be extracted from the SIM card 2025 or the memory 2030. Further, the processor 2010 may display instructional information or operational information on the display 2015 for the user's reference and convenience.

The RF module 2035 is connected to the processor 2010 and transmits and/or receives a RF signal. The processor 2010 forwards instructional information to the RF module 2035 in order to initiate communication, for example, transmit a radio signal configuring voice communication data. The RF module 2035 consists of a receiver and a transmitter to receive and transmit the radio signal. The antenna 2040 functions to transmit and receive the radio signal. Upon reception of the radio signal, the RF module 2035 may forward a signal to be processed by the processor 2010 and convert the signal into a baseband. The processed signal may be converted into audible or readable information output via the speaker 2045.

Figure 21:
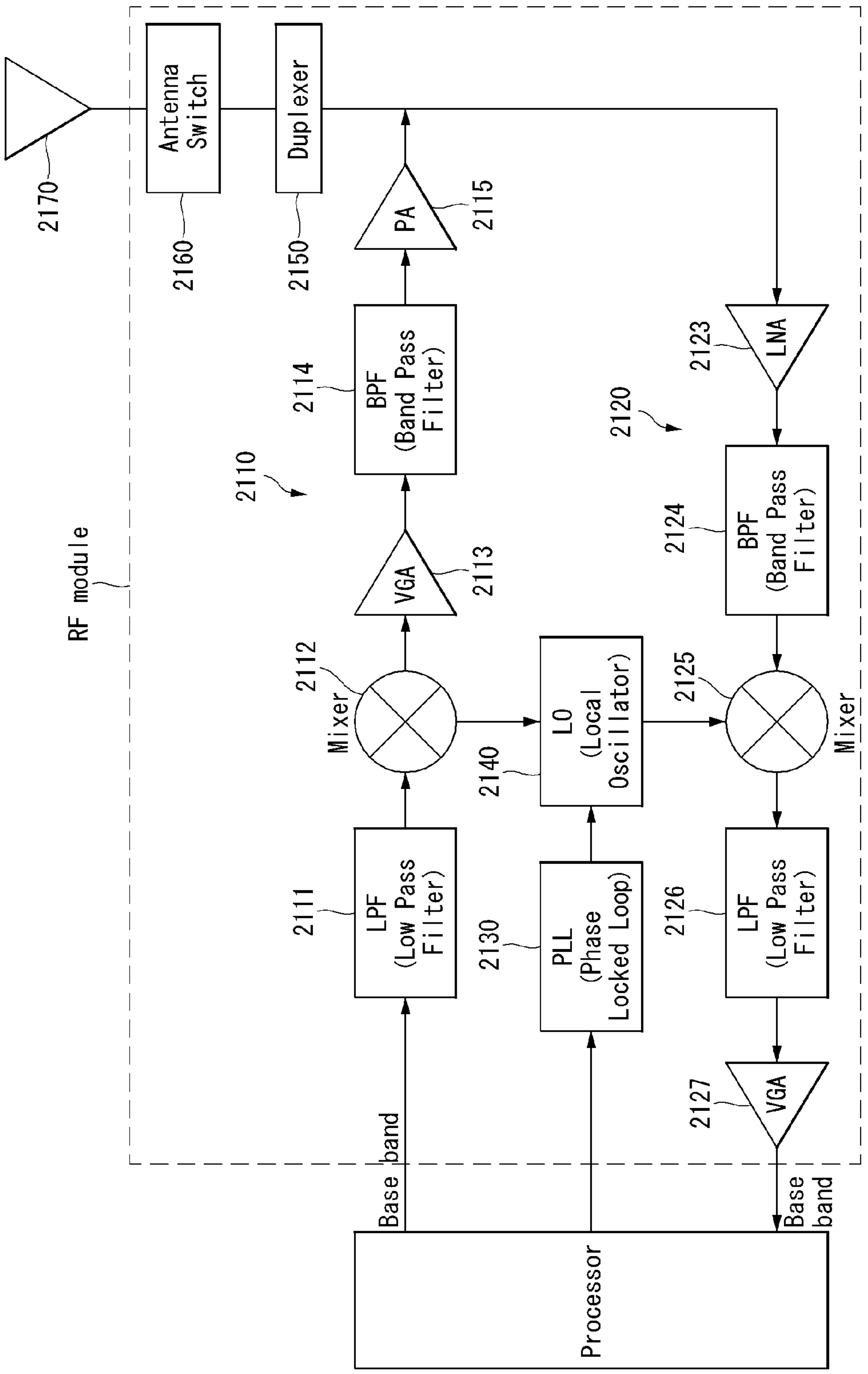
FIG. 21 illustrates an example of an RF module of a wireless communication device to which a method described in the present disclosure is applicable.

FIG. 21 illustrates an example of an RF module of a wireless communication device to which a method described in the present disclosure is applicable.

More specifically, FIG. 21 illustrates an example of an RF module that can be implemented in a frequency division duplex (FDD) system.

First, in a transmission path, the processor described in FIGS. 19 and 20 processes data to be transmitted and provides an analog output signal to a transmitter 2110.

In the transmitter 2110, the analog output signal is filtered by a low pass filter (LPF) 2111 to remove images caused by a digital-to-analog conversion (ADC), is up-converted from a baseband to an RF by an up-converter (mixer) 2112, and is amplified by a variable gain amplifier (VGA) 2113. The amplified signal is filtered by a filter 2114, is additionally amplified by a power amplifier (PA) 2115, is routed through duplexer(s) 2150/antenna switch(s) 2160, and is transmitted through an antenna 2170.

Further, in a reception path, the antenna 2170 receives signals from the outside and provides the received signals, and the signals are routed through the antenna switch(s) 2160/duplexer(s) 2150 and are provided to a receiver 2120.

In the receiver 2120, the received signals are amplified by a low noise amplifier (LNA) 2123, are filtered by a bans pass filter 2124, and are down-converted from the RF to the baseband by a down-converter (mixer) 2125.

The down-converted signal is filtered by a low pass filter (LPF) 2126 and is amplified by a VGA 2127 to obtain an analog input signal, and the analog input signal is provided to the processor described in FIGS. 10 and 11.

A local oscillator (LO) generator 2140 generates transmitted and received LO signals and provides them to each of the up-converter 2112 and the down-converter 2125.

In addition, a phase locked loop (PLL) 2130 receives control information from the processor in order to generate the transmitted and received LO signals at appropriate frequencies and provides control signals to the LO generator 2140.

The circuits illustrated in FIG. 21 may be arranged differently from the configuration illustrated in FIG. 21.

Figure 22:
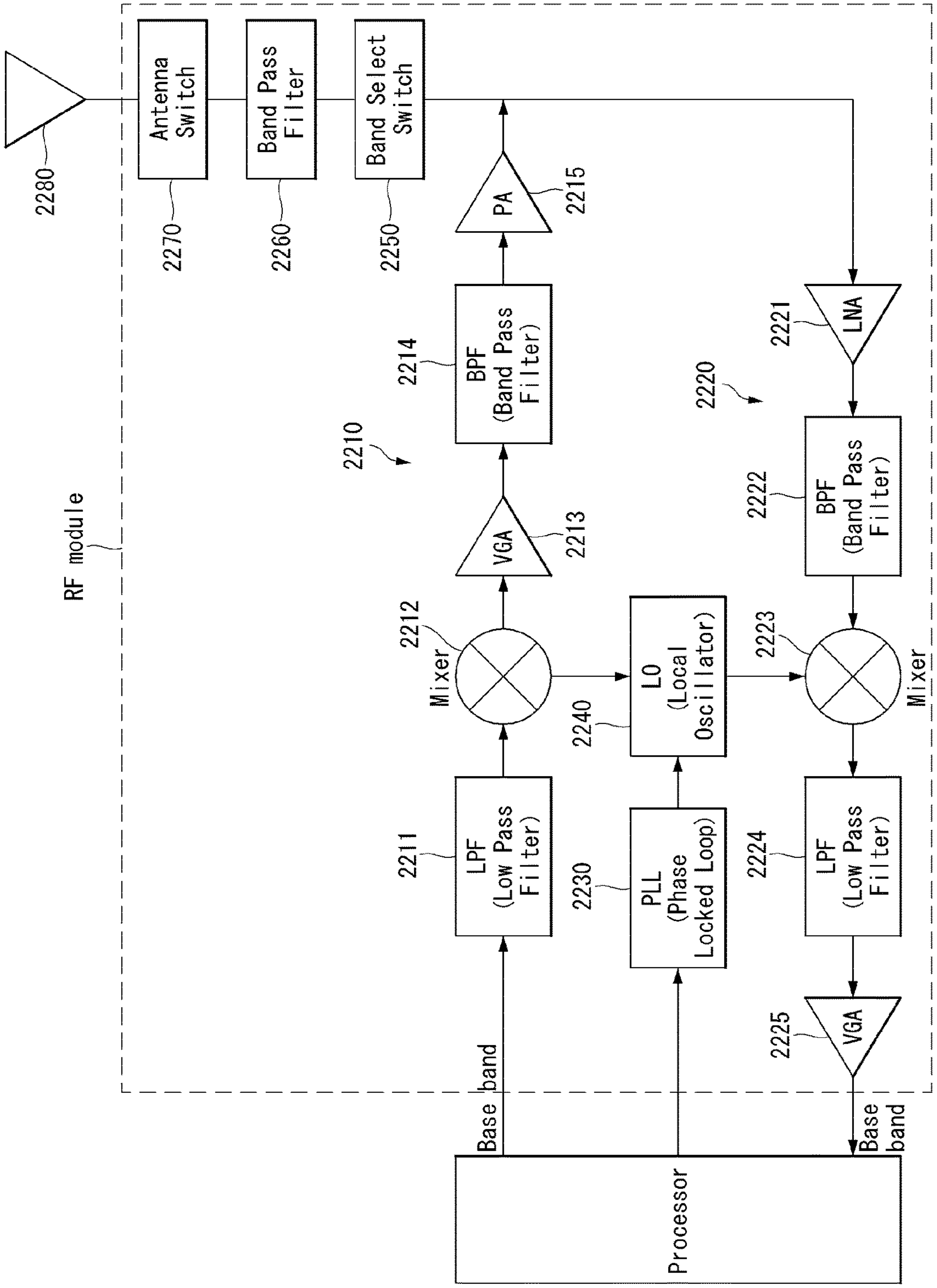
FIG. 22 illustrates another example of an RF module of a wireless communication device to which a method described in the present disclosure is applicable.

FIG. 22 illustrates another example of an RF module of a wireless communication device to which a method described in the present disclosure is applicable.

More specifically, FIG. 22 illustrates an example of an RF module that can be implemented in a time division duplex (TDD) system.

A transmitter 2210 and a receiver 2220 of the RF module in the TDD system have the same structure as the transmitter and the receiver of the RF module in the FDD system.

Only the structure of the RF module of the TDD system that differs from the RF module of the FDD system will be described below, and the same structure refers to the description of FIG. 21.

A signal amplified by a power amplifier (PA) 2215 of the transmitter 2210 is routed through a band select switch 2250, a band pass filter (BPF) 2260, and antenna switch(s) 2270 and is transmitted via an antenna 2280.

Further, in a reception path, the antenna 2280 receives signals from the outside and provides the received signals, and the signals are routed through the antenna switch(s) 2270, the band pass filter 2260, and the band select switch 2250 and are provided to the receiver 2220.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of performing a beam failure recovery in a wireless communication system according to the present disclosure has been described focusing on examples applying to 3GPP LTE/LTE-A system and the 5G system, it can be applied to various wireless communication systems other than them.

The invention claimed is:

1. A method of performing, by a user equipment (UE), a beam failure recovery in a wireless communication system, the method comprising:

detecting a beam failure;

identifying a new beam for the beam failure recovery; and transmitting, to a base station (BS), a beam failure recovery request based on a Physical Random Access Channel (PRACH) resource, wherein the PRACH resource includes a first PRACH resource and a second PRACH resource, wherein the first PRACH resource and the second PRACH resource are associated with a Synchronization Signal block (SSB), wherein a channel state information (CSI)-reference signal (RS) is spatially quasi co-located (QCL) with the SSB, wherein, based on the SSB being identified as the new beam, the beam failure recovery request is transmitted based on the first PRACH resource, wherein, based on the CSI-RS being identified as the new beam, the beam failure recovery request is transmitted based on the second PRACH resource associated with the SSB and different from the first PRACH resource, and wherein, based on both the SSB and the CSI-RS being identified as the new beam, the beam failure recovery request is transmitted based on the second PRACH resource associated with the SSB and different from the first PRACH resource.

2. The method of claim 1, wherein the new beam is at least one RS satisfying a predefined condition.

3. A method of performing, by a base station (BS), a beam failure recovery in a wireless communication system, the method comprising:

transmitting, to a user equipment (UE), information related to a new beam identification for the beam failure recovery; and receiving a beam failure recovery request from the UE based on a Physical Random Access Channel (PRACH) resource, wherein the PRACH resource includes a first PRACH resource and a second PRACH resource, wherein the first PRACH resource and the second PRACH resource are associated with a Synchronization Signal block (SSB), wherein a channel state information (CSI)-reference signal (RS) is spatially quasi co-located (QCL) with the SSB, wherein, based on the new beam being the SSB, the beam failure recovery request is based on the first PRACH resource, wherein, based on the new beam being the CSI-RS, the beam failure recovery request is based on the second PRACH resource associated with the SSB and different from the first PRACH resource, and wherein, based on both the SSB and the CSI-RS being identified as the new beam, the beam failure recovery request is transmitted based on the second PRACH resource associated with the SSB and different from the first PRACH resource.

4. The method of claim 3, wherein the new beam is at least one RS satisfying a predefined condition.

5. A user equipment (UE) configured to perform a beam failure recovery in a wireless communication system, the UE comprising:

at least one transceiver;

at least one processor; and at least one memory operably connectable to the at least one processor and storing instructions that, based on being executed by the at least one processor, perform operations comprising:

detecting a beam failure;

identifying a new beam for the beam failure recovery; and transmitting a beam failure recovery request to a base station based on a Physical Random Access Channel (PRACH) resource, wherein the PRACH resource includes a first PRACH resource and a second PRACH resource, wherein the first PRACH resource and the second PRACH resource are associated with a Synchronization Signal block (SSB), wherein a channel state information (CSI)-reference signal (RS) is spatially quasi co-located (QCL) with the SSB, wherein, based on the SSB being identified as the new beam, the beam failure recovery request is transmitted based on the first PRACH resource, wherein, based on the CSI-RS being identified as the new beam, the beam failure recovery request is transmitted based on the second PRACH resource associated with the SSB and different from the first PRACH resource, and wherein, based on both the SSB and the CSI-RS being identified as the new beam, the beam failure recovery request is transmitted based on the second PRACH resource associated with the SSB and different from the first PRACH resource.

6. The UE of claim 5, wherein the new beam is at least one RS satisfying a predefined condition.

* * * * *